US008737385B2

(12) United States Patent
Olshansky et al.

(10) Patent No.: US 8,737,385 B2
(45) Date of Patent: *May 27, 2014

(54) PBX CALL MANAGEMENT

(75) Inventors: Robert Olshansky, Wayland, MA (US); Eric R. Sporel, Westford, MA (US); Robert Liao, Chestnut Hill, MA (US); Derek Mitsumori, Lexington, MA (US); Sujin Catherine Chang, Stow, MA (US); James Flynn, Stoughton, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 266 days.

This patent is subject to a terminal disclaimer.

(21) Appl. No.: 13/045,199

(22) Filed: Mar. 10, 2011

(65) Prior Publication Data

US 2011/0164744 A1 Jul. 7, 2011

Related U.S. Application Data

(63) Continuation of application No. 11/240,599, filed on Oct. 3, 2005, now Pat. No. 7,920,692.

(51) Int. Cl.
*H04L 12/66* (2006.01)

(52) U.S. Cl.
USPC .......................................... 370/352

(58) Field of Classification Search
USPC ................................... 379/221.01; 370/352
See application file for complete search history.

(56) References Cited

U.S. PATENT DOCUMENTS

| 7,184,527 | B1 | | 2/2007 | Lin et al. | |
|---|---|---|---|---|---|
| 7,254,219 | B1 | * | 8/2007 | Hansen et al. | 379/88.17 |
| 7,283,829 | B2 | * | 10/2007 | Christenson et al. | 455/461 |
| 7,508,923 | B1 | * | 3/2009 | Samaarasinghe | 379/88.13 |
| 7,733,847 | B1 | * | 6/2010 | Croak et al. | 370/352 |
| 7,856,094 | B2 | * | 12/2010 | Khadri et al. | 379/219 |
| 2002/0114318 | A1 | * | 8/2002 | Rines | 370/352 |
| 2003/0095569 | A1 | * | 5/2003 | Wengrovitz et al. | 370/467 |
| 2004/0246822 | A1 | | 12/2004 | Wong | |
| 2005/0174987 | A1 | * | 8/2005 | Raghav et al. | 370/351 |
| 2005/0180457 | A1 | * | 8/2005 | Chen et al. | 370/466 |
| 2005/0201362 | A1 | * | 9/2005 | Klein et al. | 370/352 |
| 2005/0282543 | A1 | | 12/2005 | Idnani et al. | |
| 2006/0251054 | A1 | * | 11/2006 | Peters et al. | 370/352 |
| 2009/0034515 | A1 | * | 2/2009 | Cook et al. | 370/352 |

FOREIGN PATENT DOCUMENTS

WO  WO 98/56141  12/1998

OTHER PUBLICATIONS

Jiang, et al., "Integrating Internet Telephony Services," IEEE Internet Computing, vol. 6, Issue 3, pp. 64-72, May-Jun. 2002.
Rosenberg, at al., "SIP: Session initiation Protocol—RFC 3261," Network Working Group, The Internet Society, 252 pages, Jun. 2002.
Sparks, "The Session Initiation Protocol (SIP) Refer Method, RFC 3515," Dynamicsoft, Inc., Network Working Group, The Internet Society, pp. 1-23, Apr. 2003.

* cited by examiner

*Primary Examiner* — Sonia Gay

(57) ABSTRACT

Enhanced call management services to users receiving incoming calls on extensions on a private branch exchange (PBX) is provided by an application server configured to provide call management services to at least one of the users and a protocol proxy configured to receive call information from the PBX according to a protocol for establishing call sessions. The application server is further configured to receive the call information from the protocol proxy.

24 Claims, 15 Drawing Sheets

PBX CALL MANAGEMENT

CROSS REFERENCE TO RELATED APPLICATIONS

This application is a continuation of U.S. patent application Ser. No. 11/240,599, filed on Oct. 3, 2005, the contents of which are hereby incorporated by reference in its entirety.

BACKGROUND

As is known, a private branch exchange (PBX) is a telephone system that may be located within an enterprise such as a business, in contrast to telecommunications networks that may be accessed by the general public, such as the public switched telephone network (PSTN) or the Internet. An enterprise utilizing a PBX benefits in a number of ways, one of which is the significant cost savings that result from being able to use a pooled set of trunk lines for calls out to other networks, such as the PSTN, as opposed to having to maintain a trunk line for each telephone extension within the enterprise. Further, users within an enterprise enjoy many valuable features provided by the PBX, such as voice mail, call forwarding, conference calling, etc. Unfortunately, it is generally the case that call management features such as those described above can presently be provided only from within the PBX, thus limiting the ability of users to manage their calls from outside the PBX. Moreover, present systems and methods for accessing call management features in a PBX via an interface external to the PBX suffer from severe disadvantages.

Presently, to enable external access of a PBX for the purpose of providing call management functionality such as that described above, it is necessary to couple a gateway server to the PBX. The gateway server may communicate with the PBX using known telecommunications services such as a Primary-Rate ISDN interface (PRI). The gateway server may in turn communicate with an application server using Session Initiation Protocol (SIP), Voice over Internet Protocol (VoIP), or some other known protocol. SIP is fully discussed in J. Rosenberg et at, RFC 3261, "SIP: Session Initiation Protocol," June 2002, published by the Internet Society of Reston, Virginia, presently available on the World Wide Web (e.g., via the faqs.org web site), and fully incorporated herein by reference in its entirety.

Accordingly, it is presently possible to notify an application server of a call in a PBX, and for the application server to send instructions to the PBX regarding how the call should be handled (e.g., forward to voice mail, etc.). However, the afore-described architecture suffers from significant shortcomings. The use of the gateway introduces significant additional overhead into a call routing architecture because the PRI circuits required for communication with the gateway consume significant capacity on the PBX. Further, as should be apparent, this overhead is magnified because each call sent from the PBX to the application server results in a "hairpin" routing of a communication, in which the gateway server is responsible for sending call data to the application server, which then returns data to the PBX through the gateway server. Accordingly, the gateway server used in present architectures represents both a potential bottleneck and a potential single point of failure Thus, present architectures for external call management in a PBX are at best inefficient, and at worst unreliable.

Systems for computer-telephony integration (CTI), not requiring a gateway server as described above, are known for allowing a variety of communications, such as telephone calls, facsimiles, e-mails, and the like to be managed with a computer system. For example, call centers handling large volumes of incoming calls generally use CTI systems to route calls to monitor the availability of service agents, queue calls, and route calls to service agents, etc Similarly, call centers handling outgoing calls often use CTI systems to monitor the availability of telemarketing agents, place outgoing calls, connect telemarketing agents to calls, etc. However, present CTI systems are designed to determine how a call should be answered, i.e., where the call should be sent when it is received, but are incapable of providing a call recipient with the ability to control a call once it has been placed. Moreover, CTI systems use proprietary protocols to facilitate communications between a PBX and the application that makes determinations as to how calls should be routed, such protocols being specifically designed to support the aforementioned functionality provided by most CTI systems.

While it is not at present possible to efficiently and economically provide control of calls in a PBX from without the PBX, such functionality would be highly beneficial to users of the PBX. Most if not all users of telephones connected to a PBX in an enterprise sit in front of a computer connected to one or more networks such as an intranet, the Internet, a local area network (LAN), wide area network (WAN), etc. Further, many users having PBX extensions access computers connected to one or more networks such as the Internet when they are outside of the enterprise, e.g., when at home, at hotels, at branch office locations, etc At present, such users are not typically provided with any interface apart from a conventional telephone through which calls to their PBX extension can be efficiently and effectively managed, and in fact, users of PBX extensions generally have no way at all to determine, on a real time or near real time basis, how a call should be handled. Moreover, to the extent PBX users are presently provided with call management functionality, that functionality is limited to the particular PBX being used.

Accordingly, there is a need to provide call management functionality from outside a PBX to users having PBX extensions. It would be particularly desirable to deploy a system including a proxy utilizing a known protocol or protocols to communicate with an application server providing call management functionality. It would further be desirable for such an application server to accept inputs from a client, and to provide such inputs, specifying how a call should be handled, back to the PBX. Thus, a proxy that provided information to and from a PBX, and to and from an application server, would be a particularly desirable improvement over present systems for managing calls in a PBX.

DETAILED DESCRIPTION OF THE PREFERRED EMBODIMENTS

I. Introduction

An end-user having a phone extension in a private branch exchange (PBX) may be provided with an enhanced set of call management services via a call management server that is external to the PBX. According to some embodiments, a forwarded SIP INVITE message provides the call management server with a real-time notification of the incoming call. The call management server can then use that notification to notify an end-user of the incoming call. If so directed by the end-user, the incoming call can be forwarded to another end point, such as a desk phone, cell phone, softphone, e.g., a telephone implemented in a computer, voicemail server, announcement server, or Interactive Voice Response (IVR). The end-user generally receives notification of a call, and provides input directing how the call should be handled, on a real time basis, "real time" as used herein meaning either real time or near real time as those terms are understood by those skilled in the art. Alternatively, the call management server can send the end-user (or a surrogate for the end-user) a notification of the incoming call by email, page, Short Message Service (SMS), etc., and then redirect the incoming call back to the PBX or some other designated end-point. The call management server may also receive notifications of incoming calls from the PSTN, cellular phone networks, a Voice over Internet Protocol (VoIP) network, etc. via Advanced Intelligent Network (AIN) triggers. By also allowing the user to direct these calls to a call management server, it is advantageously possible to provide the end-user in the PBX with a unified method for managing all of the end-user's telephone services.

A. System Overview

Figure 1:
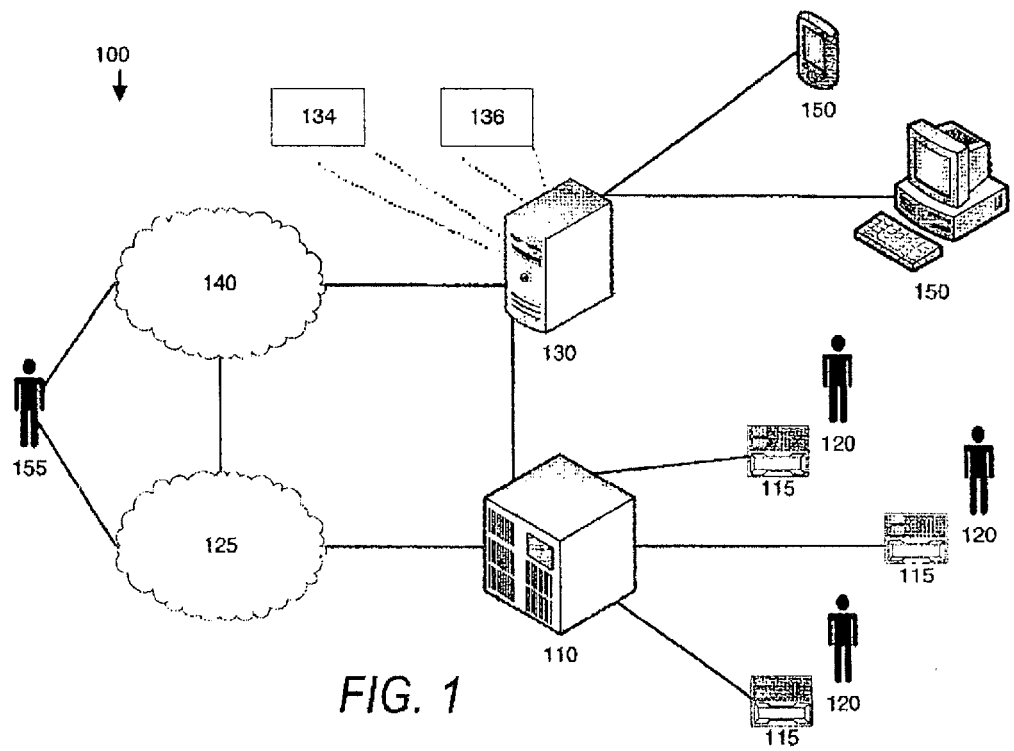
FIG. 1 is a block diagram of a system for providing enhanced PBX call management services, according to an embodiment.

FIG. 1 is a block diagram of a system 100 for providing enhanced call management services to users having extensions on private branch exchange (PBX) 110, according to an embodiment. PBX 110 includes one or more extensions 115 that, via PBX 110, allow end users 120 to receive calls from, and place calls over, one or more telecommunications networks 125. PBX 110 generally includes a Session Initiation Protocol (SIP) capable Internet Protocol (IP) interface, or is otherwise IP-enabled. It is to be understood that, whenever SIP is referred to throughout the present application, other protocols for initiating communications in a network, e.g., call sessions, could be used, and that embodiments not using SIP are possible. Further, it is to be understood that PBX 110 may represent any device known to those skilled in the art that provides the functionality of a private branch exchange or similar functionality, including Integrated Communications Systems (ICS) and the like.

When PBX 110 receives a call from one or more calling parties 155 over network 125, it forwards the call to call management server 130, which is connected to one or more telecommunications networks 140. A SIP interface on PBX 110 is used to forward the incoming call as a SIP INVITE message to the external call management server 130. Generally, one or more clients 150, associated with users 120, may be in communication with call management server 130 for the purpose of displaying information to, and receiving inputs from, users 120 regarding calls received from calling parties 155.

1. Network Details

Telecommunications network 125 represents one or more known networks over which telecommunications services such as telephony may be provided, e.g., the PSTN for circuit-switched calls, a cellular telephone network, the Internet or some other IP network for VoIP communications, etc. In some embodiments, networks 125 and 140 will in fact be the same network, e.g., a packet-switched network such as the Internet, whereas in other embodiments, such as the embodiment represented in FIG. 1, networks 125 and 140 will be different networks, e.g., network 125 may be the PSTN and network 140 may be the Internet. Further, FIG. 1 shows network 125 connected to 140, but those skilled in the art will recognize that different kinds of networks 125 and 140 may require various known types of bridges or interfaces between them.

2. Call Management Server

Call management server 130 generally includes call manager proxy 134 and call management application server 136. Call manager proxy 134 receives call information from PBX 110. In many embodiments, this means that proxy 134 is a SIP proxy that receives messages from a SIP interface attached to PBX 110 as described above, and send requests and/or instructions to call management application server 136 based on received SIP messages. Application server 136, in turn, may communicate with clients 150 for the purpose of sending and/or receiving instructions, requests, inputs, information for display, etc. Application server 136 generally includes, or communicates with, a database containing information regarding the addresses and/or locations of clients 150 along with the identities of the extensions 115 and/or particular users 120 with which each particular client 150 is associated.

In general, call management server 130, including call manager proxy 134 and call management application server 136, and also clients 150, are each combinations of software and hardware. In particular, it should be understood that proxy 134 and application server 136 may be implemented together on one physical computing device or may be implemented on more than one physical computing device. Accordingly, each of call management server 130 and clients 150 may include any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system. Call management server 130 is generally (although not necessarily) a non-portable desktop or server computer, while a client 150 may be a desktop, laptop, notebook, or handheld computer, including a personal digital assistant, cellular telephone, or similar computing device, etc. Accordingly, it will be understood that call management server 130 and client 150 may generally include a display device such as a monitor, and a user interface, as well as one or more input devices known to those skilled in the art for receiving user inputs, such as pointing devices, keyboards, touchpads, pressure sensitive screens, etc. The user interface included in each of call management server 130 and client 150 is generally a graphical user interface (GUI), although it is to be understood that other kinds of interfaces, e.g., audible interfaces providing audio output, text interfaces, etc., are practiced in certain embodiments.

Accordingly, those skilled in the art will recognize that the various processes described herein with reference to client 150 and call management server 130, including call manager proxy 134 and/or call management application server 136, may be implemented at least in part as instructions executable by one or more computers. In general, a processor (e.g., a microprocessor) receives instructions, e.g., from a memory or other computer-readable medium, and executes those instructions, thereby performing one or more processes, including one or more of the processes described herein. Such instructions may be stored and transmitted using a variety of known computer-readable media.

A computer-readable medium includes any medium that participates in providing data (e.g., instructions) which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

3. Calling Party

A calling party 155 may place a call accessing a network 125 and/or 140 in a variety of different ways known to those skilled in the art. For example, calling party 155 may use a PSTN phone via a Plain Old Telephone Service (POTS) line, a Primary Rate Interface (PRI) line, a SIP line, or a line using the International Telecommunications Union's H.323 standard for packet-based multimedia communications systems. Further, a calling party 155 may use an extension 115 on PBX 110, including local and/or tie line digital, analog, or IP telephone extensions 115.

B. Call Handling Models

There are different models according to which proxy 134 may handle calls received in PBX 110. Although three such models are described herein, it is to be understood that embodiments are possible in which other models are followed As discussed with respect to each model, there are advantages to each model. Those skilled in the art will recognize that the choice of which model to employ will often be determined by the particular features present in PBX 110 supporting the protocol, or protocols, e.g., SIP, used to communicate with proxy 134.

One such call handling model is called the Third Party Call Control model (3PCC). Under this model, PBX 110 in different embodiments sends call information to proxy 134 using either SIP INVITE or REFER messages. Under 3PCC, the proxy 134 remains in control of a call for the duration of the call. The 3PCC model thus has the advantage of making it possible to process a call according to predetermined rules. However, in embodiments using SIP, depending on how the SIP connection from the PBX 110 to the proxy 134 is licensed, the 3PCC model may be undesirable for the same reason that it advantageously allows proxy 134 to control an entire call; that is, under the 3PCC model a call consumes SIP resources for its entire duration.

A second model according to which proxy 134 may handle calls received in PBX 110 is referred to as the Call Forwarding Override (CFO) model, or the Redirect model. Under the CFO model, the proxy 134 redirects calls according to inputs received from a user 120 via a client 150. Once establishment of a call connection has been completed, i.e., forwarded to the destination selected by the user 120, the proxy 134 removes itself from the call flow, i.e., drops out of the call The CFO model thus advantageously alleviates the consumption of resources of such as SIP resources for the entire duration of a call, although those skilled in the art will recognize that it will be necessary, under the CFO model, for PBX 110 to send messages, e.g., SIP NOTIFY messages, to proxy 134 regarding call state changes.

A third model according to which proxy 134 may handle calls received in PBX 110 is referred to as the Simultaneous Ring (SimRing) model. Under the SimRing Model, PBX 110 simultaneously rings a called extension 115 while contacting proxy 134. While use of the SimRing model adds complexity to call management operations, as discussed above, the SimRing model may be required to support the configuration requirements of some models of PBX 110.

II. Process Flows

A. High Level Process Flow

Figure 2:
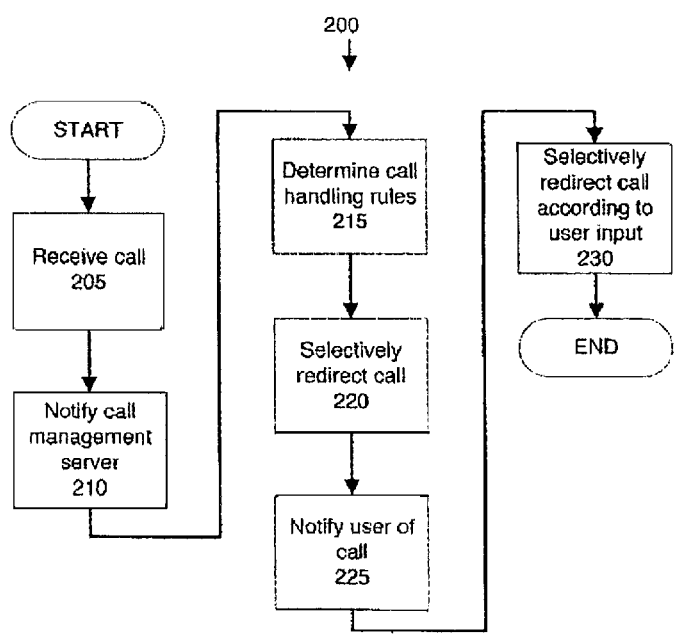
FIG. 2 is a flow diagram showing a high level process flow for receiving and handling a call to a PBX extension, according to an embodiment.

FIG. 2 is a flow diagram showing a high level process flow 200 for receiving and handling a call to a PBX extension 115, according to an embodiment. The process 200 generally applies regardless of the call handling model that is being used; certain differences in how the process 200 might be implemented depending on the call handling model being used are pointed out in the discussion below.

In step 205, PBX 110 receives a call for an extension 115. The received call may originate from a network 125, a tie-line trunk to PBX 110, another extension 115 within the PBX 110, etc. Following step 205, control proceeds to step 210.

In step 210, PBX 110 notifies call management server 130 of the call, in many embodiments by forwarding the call received in step 205 to call management server 130. In various embodiments the call may be forwarded via (1) a SIP interface to proxy 134 included within call management server 130, or (2) a local extension 115 belonging to call management server 130 having a SIP interface that is registered to the PBX 110. In any event, the result of the call forwarding performed in step 210 is that call management server 130 receives a SIP INVITE request and establishes a call session.

Further, in some embodiments, under the SimRing model discussed above, in step 210 the PBX 110 simultaneously rings both the extension 115 for which the call was intended and a local extension 115 belonging to call management server 130. Those skilled in the art will recognize that, in such embodiments, provisions must be made to avoid race conditions. That is, the call management server 130 should terminate the call if call-forwarding is provided for the call in PBX 110, if a predetermined time (configurable in most embodiments) has expired, or if a user 120 answers the call or makes a real-time forwarding decision as described below with respect to step 230.

Moreover, in some embodiments, the call received in step 205 is not forwarded to call management server 130 at all. In these embodiments, PBX 110 holds the call in an internal queue, and the notification performed in step 210 includes querying call management server 130, e.g., in some embodiments, application server 136 via proxy 134, for instructions regarding how to handle the call. Such instructions are based on the call handling rules and user inputs described below with reference to steps 215-230. In the presently referred to embodiment, as with other embodiments, instructions for handling calls, e.g., redirecting, forwarding, etc., are provided by call management server 130 based on call handling rules as discussed below. However, in the presently referred to embodiment, such instructions are applied not by call management server 130, as discussed below, but rather are applied by PBX 110 to the call held in the internal queue mentioned above, according to instructions provided through proxy 134. Embodiments using such an internal queue are only available where PBX 110 provides such a queue, and advantageously reduces overhead bypassing information related to a call between the PBX 110 and call management server 130, rather than the call itself.

Following step 210, control proceeds to step 215. In step 215, call management server 130, e.g., in some embodiments, application server 136, determines the rule or rules that apply for handling calls to the extension 115 for which a call was received in step 205. Specific call handling rules implemented in various embodiments are discussed in more detail below. In general, the call handling rule or rules determined in step 215 specify a location, e.g., a second telephone number, Uniform Resource Indicator (URI), etc, to which the call received in step 215 should be forwarded.

The call handling rules determined in step 215 may be implemented in a variety of different ways. For example, in some embodiments, a call forwarding table is used in application server 136 to identify a telephone number or SIP URI to which the call should be forwarded. In some embodiments, the call forwarding table includes or is associated with calendar information that allows for different call handling rules to apply to calls intended for an extension 115 depending on the day, date, and/or time. Where a SIP URI is included in the call forwarding table, the URI may represent any one of a number of different resources known to those skilled in the art, such as a telephone, an interactive voice response system (IVR), an announcement server, etc. Further, the call handling rules determined in step 215 may be implemented according to various heuristics instead of, or in addition to, the call forwarding table described above.

In order for call handling rules to be properly accessed in step 215, it is important that an Originally Called Number (OCN), i.e., telephone number or other identifier, be included in the signaling that forwards the call received in step 205 to call management server 130 in step 210. The OCN or other identifier allows call management server 130 to access the call handling rules that should be applied for a particular extension 115 and/or user 120. The OCN associated with a call may be provided to call management server 130 in a number of different ways. One way in which the OCN may be provided to call management server 130 is by providing the OCN as part of the header information provided with the call. In some embodiments, the OCN provided as part of Signaling System 7 (SS7) call signaling message associated with the call may be mapped to SIP information, as described in G. Camarillo et al., RFC 3398, "Integrated Services Digital Network (ISDN) User Part (ISUP) to Session Initiation Protocol (SIP) Mapping," December 2002, published by the Internet Society of Reston, Va., available on the world wide web (presently via the faqs.org web site), and fully incorporated herein by reference in its entirety.

Further, in some embodiments, each extension 115 may be assigned an unpublished, "phantom" telephone number, i.e., a unique telephone number to which calls should be forwarded by PBX 110. Upon receiving a call forwarded from an extension 115 to such a phantom number, a routing table or similar reference consulted by PBX 110 for routing calls directs that the call be routed to proxy 134. The unique phantom number is then also used as a unique identifier for the extension 115 (and, consequently, generally also for a user 120) within call management server 130, which contains routing tables, lookup tables, etc., or accesses a database containing such information.

Moreover, in some embodiments, each trunk outbound from PBX 110 is assigned a unique prefix. This prefix may be appended to the OCN (or other identifier) in the "To" field described in SIP, and used by the PBX to select the proper trunk when forwarding the call. Upon forwarding the call, the prefix may be stripped from the "To" field, thereby providing the OCN in the "To" field when it is forwarded to call management server 130.

Following step 215, control proceeds to step 220. In step 220, call management server 130 selectively redirects the call received in step 205, i.e., call management server 130 takes action with respect to the call according to the call handling rule or rules identified in step 215. In some embodiments, not shown in FIG. 2, the process 200 ends following step 220. Further, in some embodiments, step 220 is skipped altogether, or occurs after one of steps 225 or 230, and in either case control proceeds directly from step 215 to step 225. However, in some embodiments, control proceeds to step 225 following step 220

In step 225, one or more users 120 is notified of the call received in step 205. This notification may take one or more different forms in various embodiments, some of which are described in more detail below For example, a pop-up window with information relating to the call may be displayed within an interface of a client 150. Such a pop-up widow may present the user 120 with various choices regarding a call, such as forward to voice-mail, forward to a specified extension 115, forward to another telephone number, do not disturb, etc. Further, call management server 130 may send, or may cause to be sent, a message such as an e-mail, page, SMS message, etc., to client 150. In some embodiments, not shown in FIG. 2, the process 200 ends following step 225. However, in some embodiments, following step 225, control proceeds to step 230.

In step 230, the call received in step 205 is selectively redirected according to one more inputs provided by a user 120 via a client 150. In many embodiments, the user 120 is presented with a list of one or more options that may be selected regarding a call in an interface such as a GUI on client 120, and selects one or more of the options through the interface. For example, as described in more detail below, a user 120 may choose to forward a call to voice mail, forward a call to another telephone number, etc. In some embodiments, the process waits for user 120 input for a predetermined period of time (e g., 18 seconds in one embodiment) and, if such input is not received within the predetermined period of time, redirects the call according to specified rules. Following step 230, the process 200 ends.

In general, when call management server 130 redirects or forwards a call, for example, as described above with reference to FIG. 2, it may do so using SIP REDIRECT, REFER, or UPDATE messages. Alternatively, call management server 130 may redirect or forward calls using call control devices known to those skilled in the art to establish a new call leg and then updating the original call leg via SIP INVITE or REPLACE procedures to modify the media flow between the endpoints of each call. Examples of calls being redirected, including the use of such messages, are provided below in FIGS. 3-16

B. Exemplary Call Flows

FIGS. 3-16 depict exemplary call flows practiced in various embodiments according to the three call handling models discussed above, and in general according to the high level process flow 200. It should be understood that various embodiments implementing a particular call handling model may incorporate one or more of the call flows described below with respect to a particular call handling model. It should further be understood that other embodiments are possible, even likely, in which call flows other than the exemplary call flows described below with respect to FIGS. 3-16 are practiced.

1. 3PCC Model a Call Notification

Figure 3:
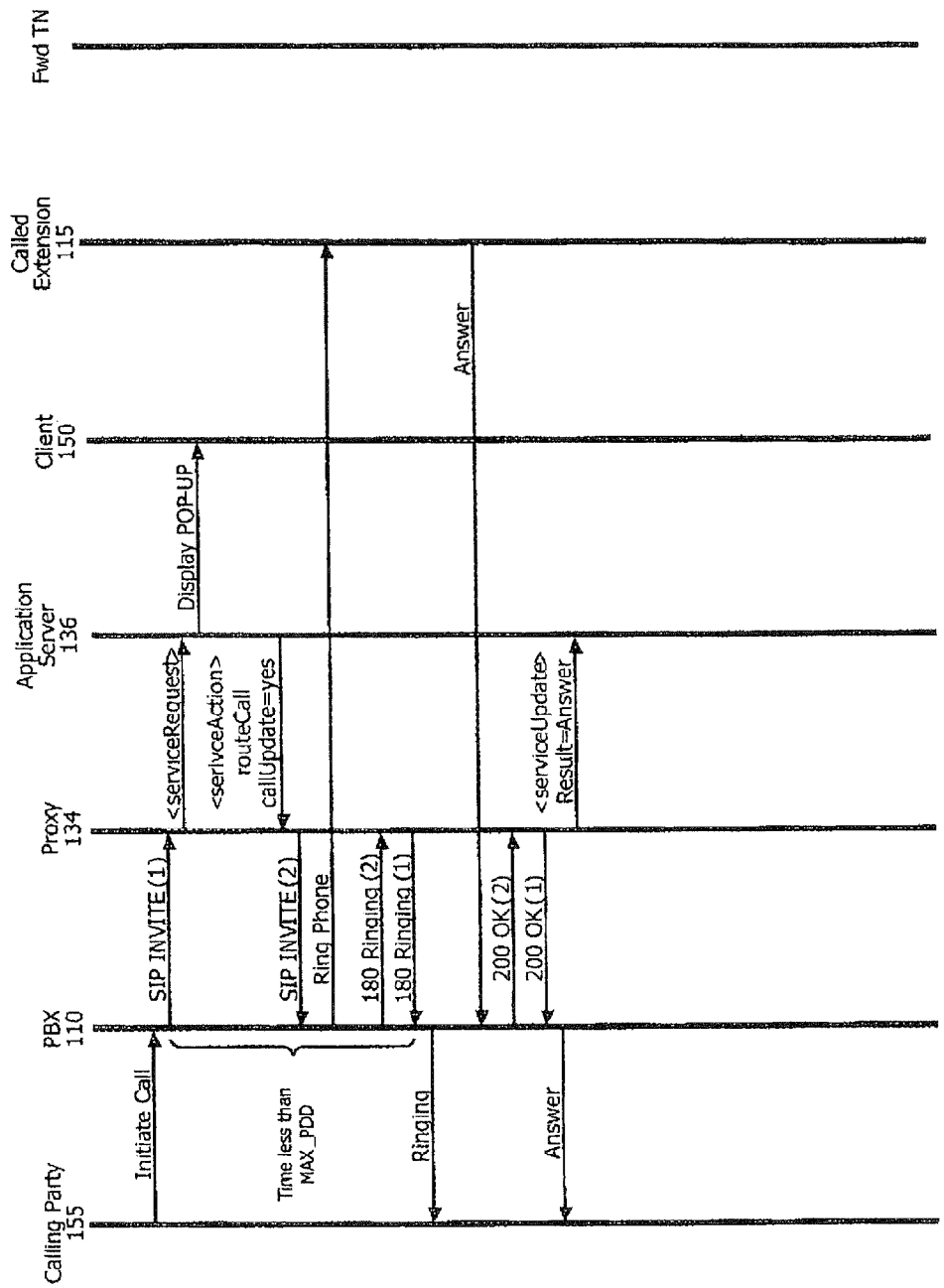
FIG. 3 is a call flow diagram for a call handled under the Third Party Call Control model, where call handling rules provide for a user to receive notification of a call via a client, according to an embodiment.

FIG. 3 is a call flow diagram for a call handled under the 3PCC model, where call handling rules provide for user 120 to receive real time notification of a call via a client 150, according to an embodiment. As shown in FIG. 3, a call request from a calling party 155 directed to a called party (user 120) associated with a called extension 115 is received at PBX 110. PBX 110, upon receiving the call request, sends a SIP INVITE message to proxy 134 of call management server 130. As noted above, this INVITE message may include an indication of the called extension 115. PBX 110 may also provide a ring signal to the calling party 155 to indicate that the call request is proceeding. The ring signal may be delayed until the processing illustrated in FIG. 3 has been completed, but to avoid confusion for calling parties may be provided after a maximum delay period ("MAX_PDD" on FIG. 3), for example, 3 seconds Proxy 134 receives the INVITE message, establishes a SIP call session for the call request, and sends a service request to the application server 136 of call management server 130. Application server 136, upon receiving the service request from proxy 134, identifies a client 150 associated with user 120, and causes a pop-up window to be displayed by client 150. The pop-up window may include such information as the name of the calling party, the caller ID number or other line identifier for the calling party, and/or a location of the calling party. Such information may be obtained by application server 136, as noted above, through access to various databases, such a network provider databases or private contact databases. The pop-up window may be displayed on the client for a predetermined amount of time (e.g., 18 seconds in some embodiments).

In the embodiment illustrated by FIG. 3, application server 136 concurrently sends a response message to proxy 134 indicating that the call should be routed as indicated. Proxy 134 in turn sends a SIP INVITE message to PBX 110, indicating that the PBX should attempt to connect the call as indicated. PBX 110 then attempts to connect the call to the called extension 115 of the called party, i.e., user 120, using a signaling method appropriate to the connection (e.g., Q.931, SIP, H.323, SS7, etc). Upon answer at called extension 115, the PBX 110 connects the call between the calling party and called party, and indicates to the proxy 134 (e.g., using a SIP OK message) that the call has been established.

b. Route to Default Telephone Number

Figure 4:
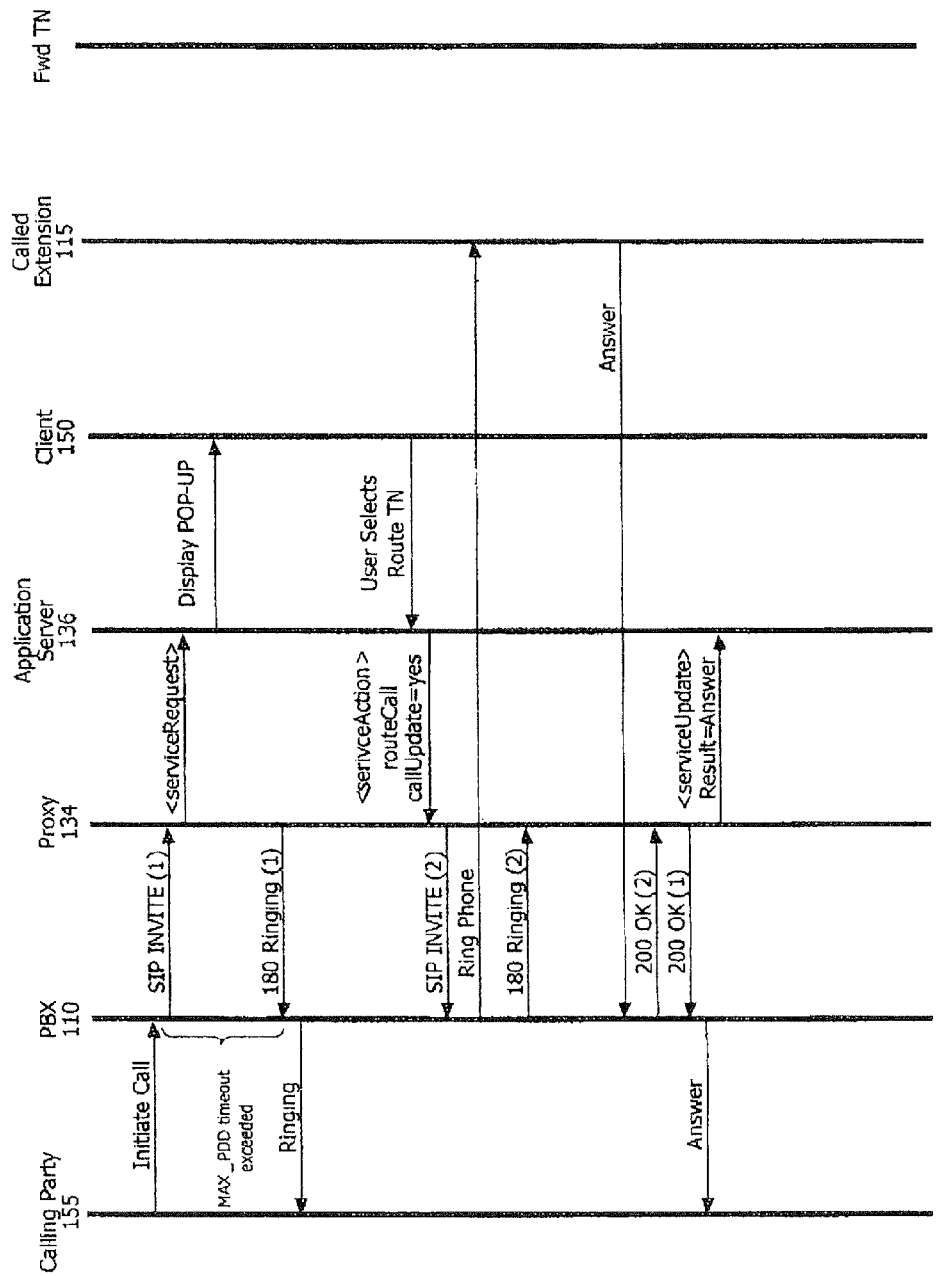
FIG. 4 is a call flow diagram for a call handled under the Third Party Call Control model, where call handling rules provide for a user to receive real time notification of a call via a client, and to make a real time selection to route the call to a predetermined (i.e., default) telephone number, according to an embodiment.

FIG. 4 is a call flow diagram for a call handled under the 3PCC model, where call handling rules provide for user 120 to receive real time notification of a call via a client 150, and to make a real time selection to route the call to a predetermined (i.e., default) telephone number, according to an embodiment. The initial steps of the embodiment of FIG. 4 are similar to those of FIG. 3. PBX 110 receives a call request from calling party 155 to a called extension 115, PBX 110 sends a SIP INVITE message to proxy 134, proxy 134 sends a service request message to application server 136, and application server 136 causes a pop-up window to be displayed on a client 150 associated with the called party. In contrast to FIG. 3, in FIG. 4 it can be seen that, once a pop-up window is displayed on client 150, application server 136 and proxy 134 take no action until application server 136 receives a selection from user 120 via client 150 to route the call to the predetermined telephone number (which, in this example, is the called extension 115). The user 120 has a predetermined amount of time to make a selection in the pop-up window, and if a selection is not made within the predetermined period of time (e g., eighteen seconds in some embodiments), PBX 110 may be configured to take some default action, e.g., route to voice mail, forward the call, etc. During the period between receipt of the call request from the calling party 155 and the selection by the user 120, the PBX 110 may simply send a ring signal calling party 155.

Once a user selection is received, application server 136 sends a response message to proxy 134 indicating that the call should be routed to the predetermined telephone number, which causing proxy 134 to in turn send a SIP INVITE message to PBX 110 indicating the routing decision. PBX 110 then attempts to connect the call to the predetermined telephone number (in this example, called extension 115) using an appropriate signaling method, and the call is established in a manner similar to FIG. 3.

c. Call Forward

Figure 5:
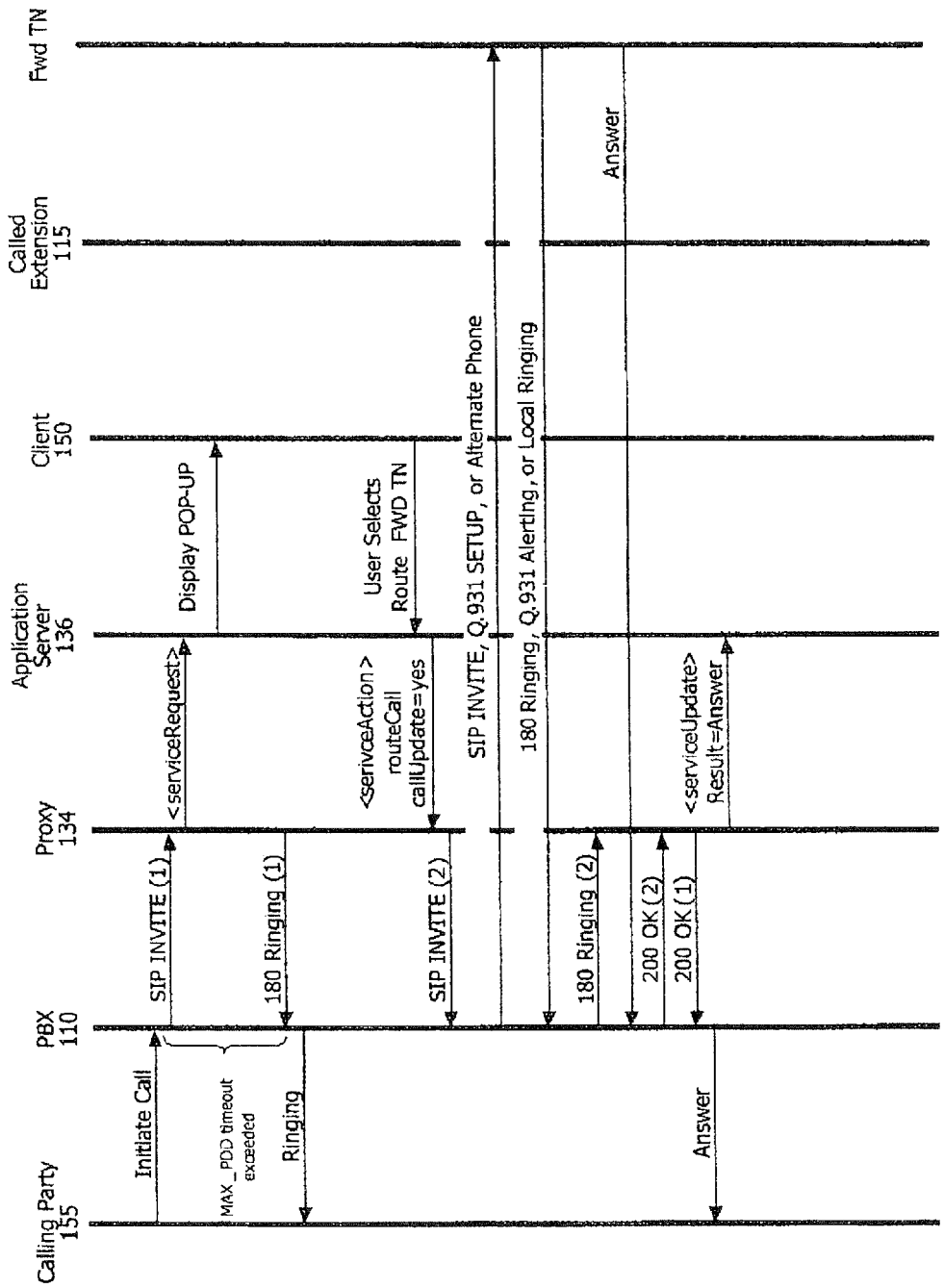
FIG. 5 is a call flow diagram for a call handled under the Third Party Call Control model, where call handling rules provide for a user to receive real time notification of a call via a client, and to make a real time selection as to a telephone number to which the call should be forwarded, according to an embodiment.

FIG. 5 is a call flow diagram for a call handled under the 3PCC model, where call handling rules provide for user 120 to receive real time notification of a call via a client 150, and to make a real time selection as to an address (e.g, a telephone number) to which the call should be sent, according to an embodiment. The initial steps of the embodiment illustrated in are the same as those of FIGS. 3 and 4. Upon causing the pop-up window to be displayed on client 150, application server 136 waits for a response from user 120 via client 150 indicating an address to which the call should be sent. This may be achieved by providing the user 120 with various selectable objects in the pop-up window (e.g., links, pull-down menus, etc.) or by allowing the user to free-form enter an address. Identifiers for various addresses (e.g., "home," "mobile," "Mom," etc) may be provided, which may be interpreted by application server 136 to identify the corresponding network address. The application server 136 then sends a response message to proxy 134 indicating the selected address for forwarding, and proxy 134 sends a message, e.g., a SIP INVITE message, to PBX 110 indicating the selected address. PBX 110 then attempts to connect the call to the selected address instead of the called extension 115 using an appropriate signaling method for the selected address, and the call is established in a manner similar to FIGS. 3 and 4.

d. Forward to Voicemail

Figure 6:
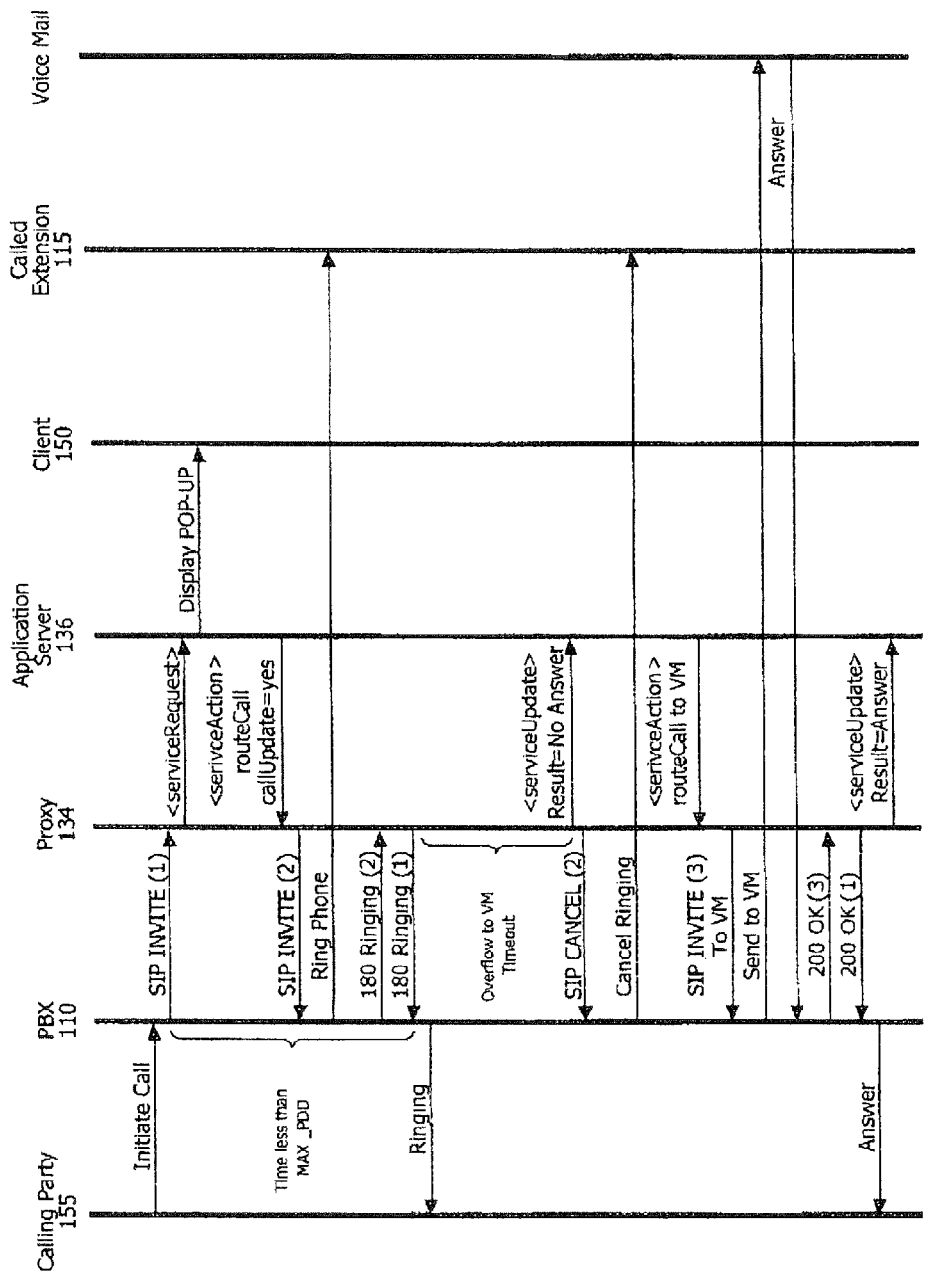
FIG. 6 is a call flow diagram for a call handled under the Third Party Call Control model, where call handling rules provide for a user to receive real time notification of a call via a client, and to make a real time selection to forward the call to a voice mail account, according to an embodiment.

FIG. 6 is a call flow diagram for a call handled under the 3PCC model, where call handling rules provide for a user 120 to receive real time notification of a call via a client 150, and to make a real time selection to forward the call to a voice mail account, according to an embodiment. In this embodiment, a call may be sent to voice mail either upon the selection of a user 120 via a client 150, or by default, Thus, in this embodiment, even if client 150 is turned off or for some reason is unable to receive messages from application server 136, a call may be sent to voicemail even if the user 120 is unable to answer or otherwise respond to the call.

The initial steps of the embodiment illustrated by FIG. 6 are the same as for FIGS. 3-5. As shown in FIG. 6, after the application server 136 causes the pop-up window to be displayed on client 150, it sends a response message to proxy 134 indicating that the call should be connected to the called extension 115. Proxy 134 sends a SIP message to PBX 110 indicating that the call should be connected to called extension 115. PBX 110 then attempts to connect the call to called extension 115 using an appropriate signaling method.

The proxy 134 sets a timeout period for the call attempt to called extension 115. If no response is received from the application server 136 (indicating that an instruction has not been received from the client 150) or from the PBX 110 (indicating an answer at called extension 115) prior to the end of the timeout period, proxy 134 indicates to application server 136 that the call result was no answer, and to PBX 110 that the call attempt to called extension 115 should be cancelled. Application server 136 may then send a message to proxy 134 to route the call to a voice mail associated with the called extension 115 or user 120. Proxy 134 then sends a message to PBX 110 to establish a connection with the associated voice mail, and PBX 110 establishes the connection (using an appropriate signaling method) with the associated voice mail.

Additionally, although not shown in the call flow diagram of FIG. 6, application server 136 may receive a response from client 150 indicating the call should be sent directly to voicemail. In such a case, the application server 136 may send a message to proxy 134 to route the call to a voice mail associated with the called extension 115 or user 120, without waiting for the end of the timeout period. Proxy 134 then sends a message to PBX 110 to cancel the call attempt to the called extension 115 and establish a connection with the associated voice mail.

e. Find Me Follow Me

Figure 7:
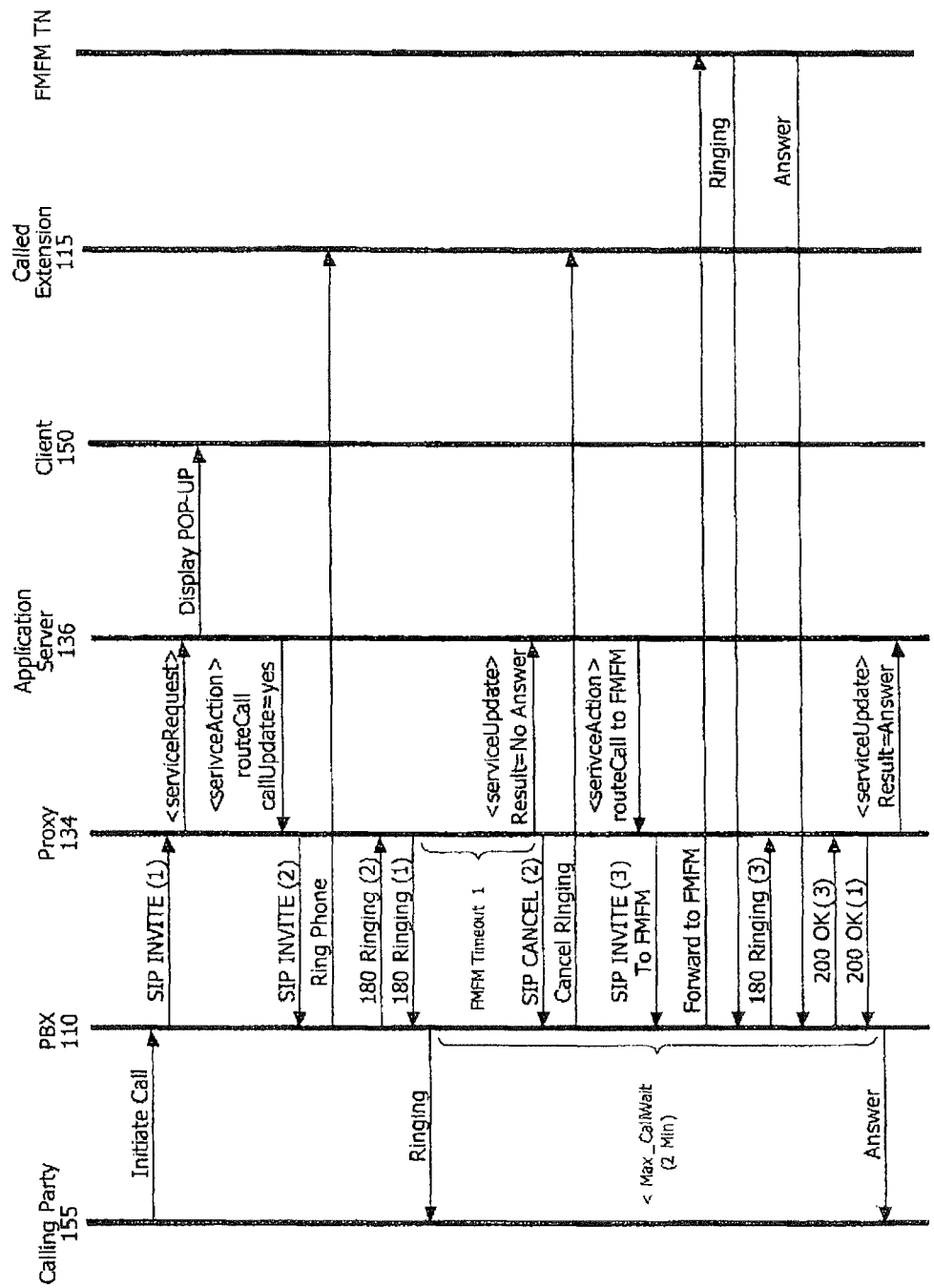
FIG. 7 is a call flow diagram for a call handled under the Third Party Call Control model, where call handling rules provide for a user to receive real time notification of a call via a client, and for a call to be forwarded according to find me follow me rules, according to an embodiment.

FIG. 7 is a call flow diagram for a call handled under the 3PCC model, where call handling rules provide for user 120 to receive real time notification of a call via a client 150, and for a call to be forwarded according to find me follow me (FMFM) rules, according to an embodiment. FMFM, as is known to those skilled in the art, comprises a set of rules for forwarding a call so that a call may be answered by the particular user 120 at a variety of different telephone numbers, including different extensions 115. The initial steps of the embodiment of FIG. 7 are the same as those for FIGS. 3-6. Furthermore, similar to the embodiment of FIG. 6, after the application server 136 causes the pop-up window to be displayed on client 150, it sends a response message to proxy 134 indicating that the call should be connected to the called extension 115, which then sends a message to PBX 110 indicating that the call should be connected to called extension 115. PBX 110 attempts to connect the call to called extension 115 using an appropriate signaling method.

Figure 8:
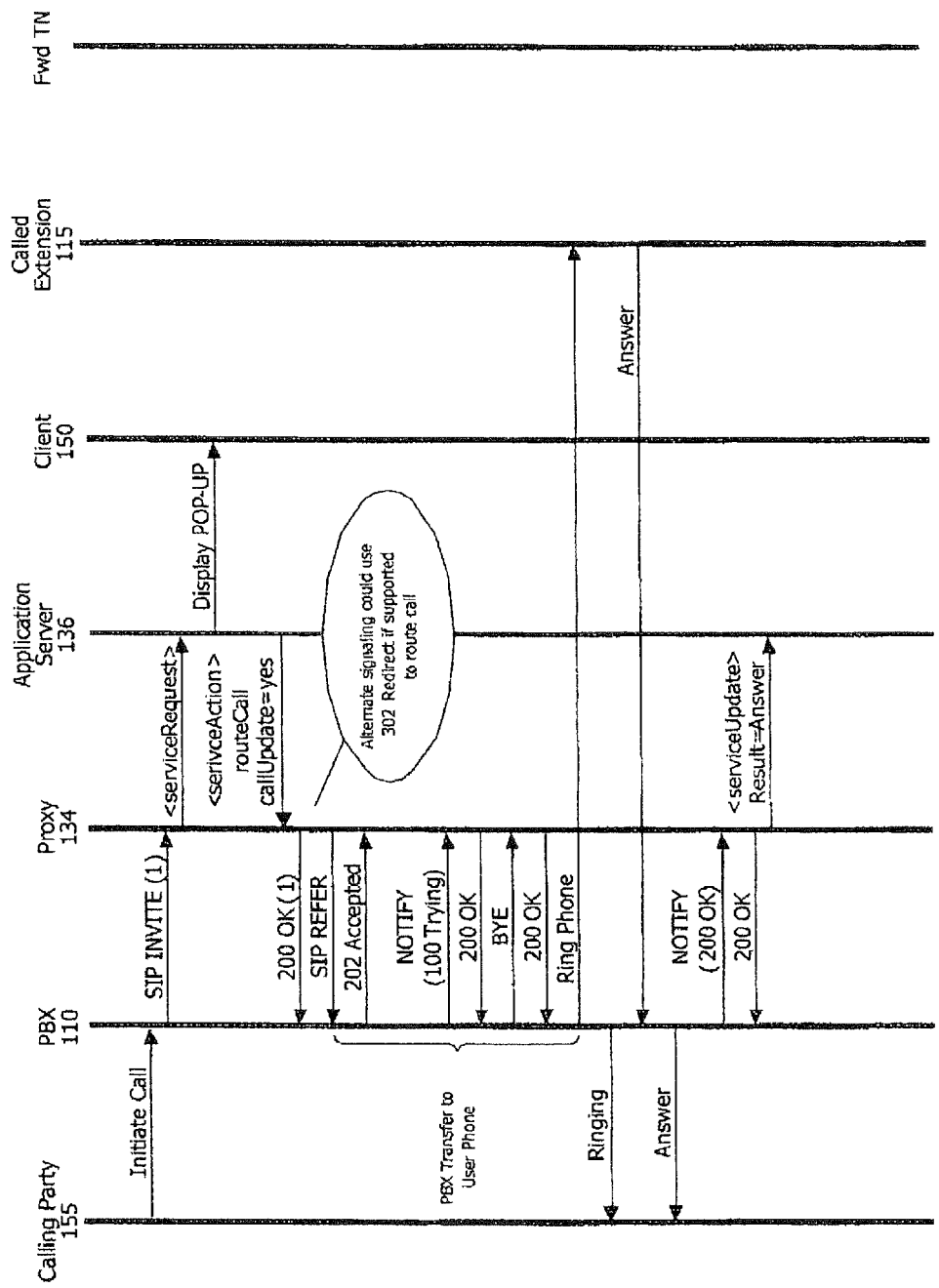
FIG. 8 is a call flow diagram for a call handled under the Call Forwarding Override model, where call handling rules provide for a user to receive notification of a call via a client, according to an embodiment.

As indicated in FIG. 7, the proxy 134 sets a timeout period for the call attempt to the called extension 115. If no response is received from the application server 136 (indicating that an instruction has been received from the client 150) or from the PBX 110 (indicating an answer at called extension 115) prior to the end of the timeout period, proxy 134 indicates to application server 136 that the call result was no answer, and to PBX that the call attempt to called extension 115 should be cancelled. Application server 136 may then send a message to proxy 134 to attempt a find me follow me for the call—for example, the application server may send an address (e.g., a telephone number) for user 120 that is indicated as the first routing option for find me follow me purposes. Proxy 134 then sends a message to PBX 110 to establish a connection with the find me follow me address, and PBX 110 attempts to establish the connection (using an appropriate signaling method) with the find me follow me address. If the call is answered at the find me follow me address, the call is established and connected. Although not shown in FIG. 7, if the call attempt to the find me follow me number does not result in an answer, additional find me follow me attempts may be made using the same steps as indicated above 2. CFO Model a. Call Notification FIG. 8 is a call flow diagram for a call handled under the CFO model, where call handling rules provide for user 120 to receive notification of a call via a client 150, according to an embodiment. The initial steps of the embodiment shown in FIG. 8 are the same as for FIGS. 3-7: PBX 110 receives a call request from calling party 155 to a called extension 115, PBX 110 sends a SIP INVITE message to proxy 134, proxy 134 sends a service request message to application server 136, and application server 136 causes a pop-up window to be displayed on a client 150 associated with the called party. Once application server 136 has caused the pop-up window to be displayed by client 150, it sends a message to proxy 134 indicating that the call should be connected to the called extension 115. Proxy 134 in turn sends a SIP REFER message to PBX 110, which in response indicates its acceptance of the referral using an acceptance message to proxy 134. PBX 110 then attempts to connect the call to the called extension 115, and notifies proxy 134 of the result of the call attempt (in this example, a completed call connection).

NOTIFY messages as shown in FIG. 8 and others of the drawing figures herein are described in R. Sparks, RFC 3515—The Session Initiation Protocol (SIP) Refer Method, April 2003, published by the Internet Society of Reston, Va., and available on the World Wide Web, fully incorporated herein by reference. RFC 3515 describes the REFER method of transferring calls. NOTIFY messages provide updates to the current state of the pending transfer request, (100 Trying) indicating the PBX is attempting to establish a connection and the 200 OK that it was successful. It is to be understood that all of the signaling examples provided herein are based on an abbreviated format and do not reflect all the messages that occur during call setup as defined in RFC 3261, incorporated herein by reference above and other corresponding RFCs such as RFC 3515. FIG. 8 is also a logical representation of a call state and does not reflect exact time-referenced messages. For example, the Ringing and Answer messages from PBX 110. to Calling Party 155 may actually occur after the 200 OK (1) from Proxy 134 to PBX 110

It will be seen that the call flow of FIG. 8 is similar to the call flow of FIG. 3, although in FIG. 8, proxy 134 sends a SIP REFER message to PBX 110, and not an INVITE message, thus requesting that PBX 110 directly control the process of connecting the call to called extension 115. Thus, in this embodiment, the call session does not include proxy 134.

b. Route to Default Telephone Number

Figure 9:
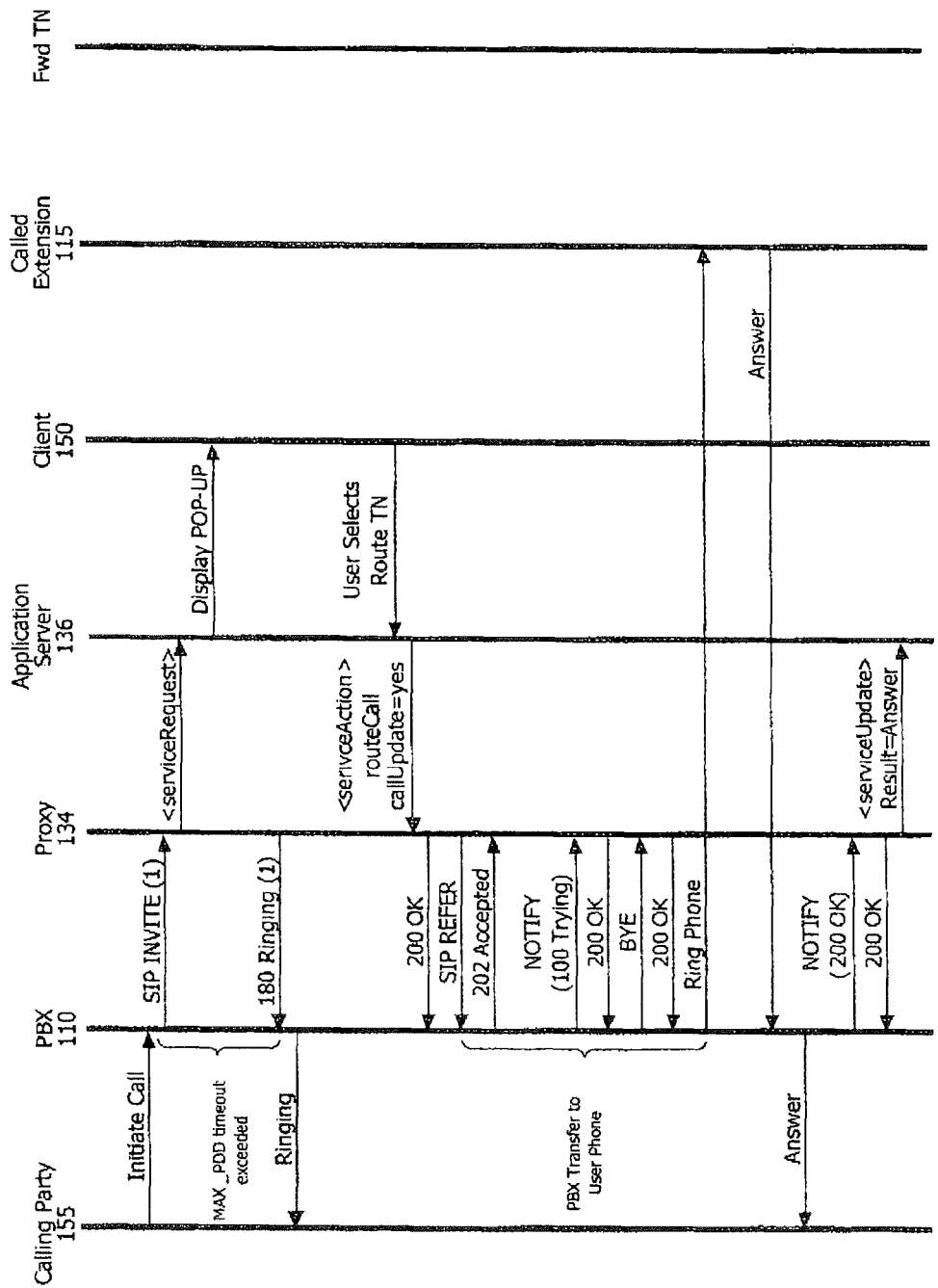
FIG. 9 is a call flow diagram for a call handled under the Call Forwarding Override model, where call handling rules provide for a user to receive real time notification of a call via a client, and to make a real time selection to route the call to a predetermined (e.g., default) telephone number, according to an embodiment.

FIG. 9 is a call flow diagram for a call handled under the CFO model, where call handling rules provide for user 120 to receive real time notification of a call via a client 150, and to make a real time selection to route the call to a predetermined (i.e., default) telephone number (in this example, the called extension 115), according to an embodiment. It will be seen that the call flow of FIG. 9 is similar to the call flow of FIG. 4, although in FIG. 9 (as was the case for the example of FIG. 8), proxy 134 sends a SIP REFER message to PBX 110, and not an INVITE message, thus requesting that PBX 110 directly control the process of connecting the call to called extension 115, rather than using proxy 134 to establish the call session with or through PBX 110.

c. Call Forward

Figure 10:
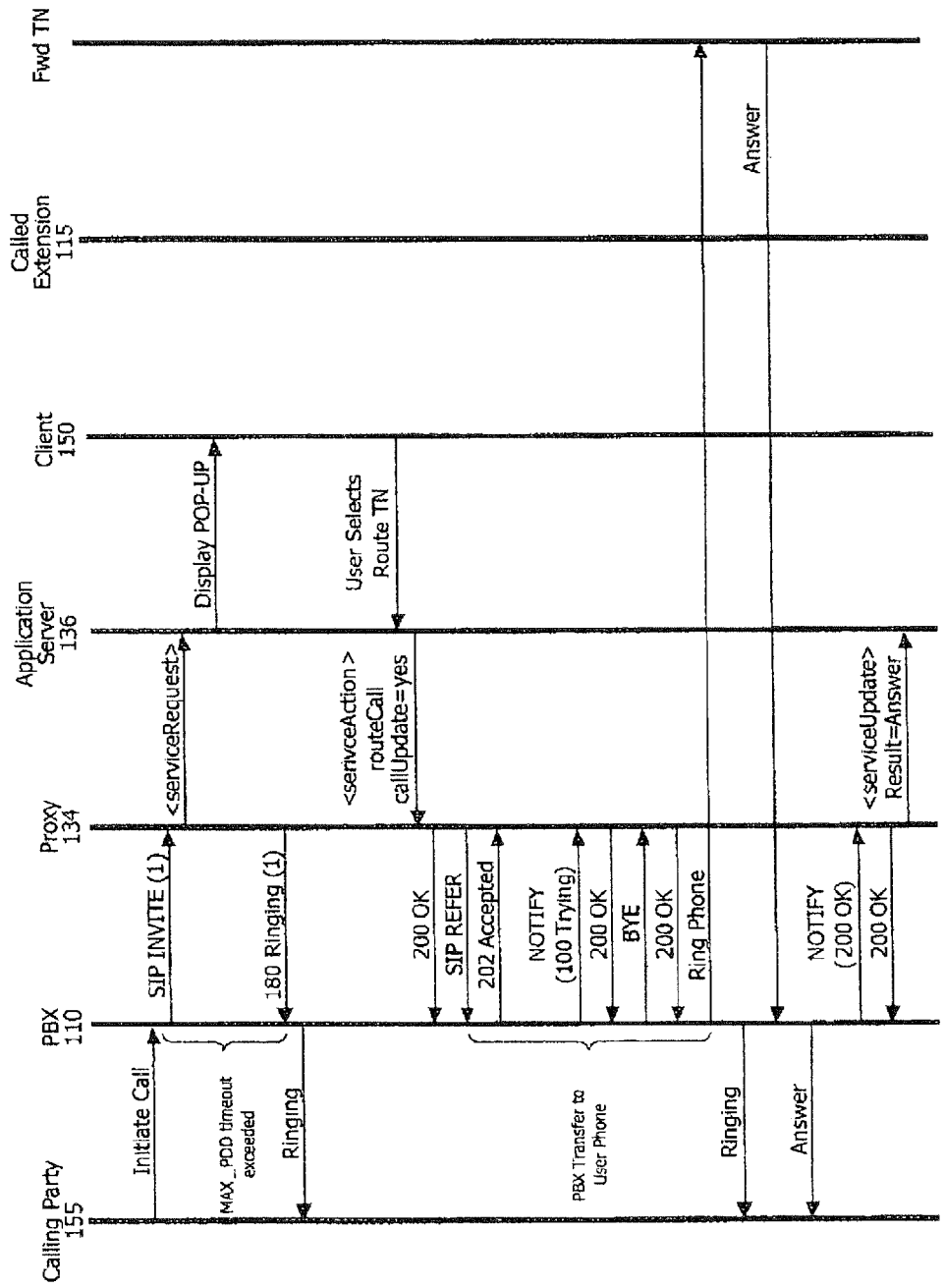
FIG. 10 is a call flow diagram for a call handled under the Call Forwarding Override model, where call handling rules provide for a user to receive real time notification of a call via a client, and to make a real time selection as to a telephone number to which the call should be sent, according to an embodiment.

FIG. 10 is a call flow diagram for a call handled under the CFO model, where call handling rules provide for user 120 to receive real time notification of a call via a client 150, and to make a real time selection as to an address (e.g., a telephone number) to which the call should be sent, according to an embodiment. The call flow of FIG. 10 is similar to the call flow of FIG. 5, except that proxy 134 additionally determines whether the user selected address from client 150 is an extension 115 available through PBX 110. That is, FIG. 10 shows Client 150 selecting a number to forward so that, in this example, the number to which a call is forwarded is not an extension 115 available through the PBX 110. Proxy 134 sends a SIP REFER message to PBX 110 (as was the case in the examples of FIGS. 8 and 9), and not an INVITE message, thus requesting that PBX 110 directly control the process of connecting the call to the selected number.

Figure 11:
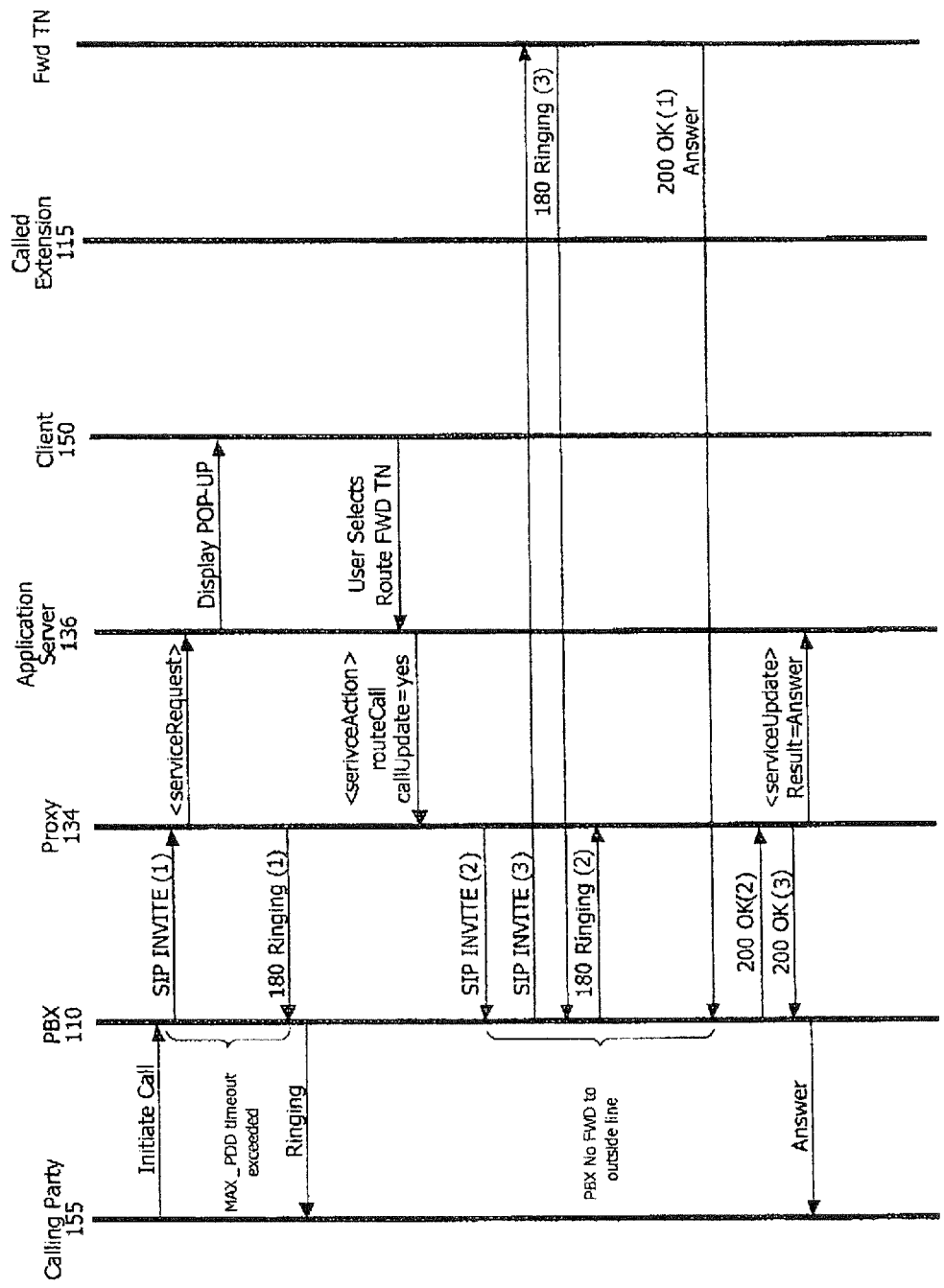
FIG. 11 is a call flow diagram for a call handled under the Call Forwarding Override model, where call handling rules provide for a user to make a real time selection via a client to forward the call to a telephone number outside a PBX, according to an embodiment.

FIG. 11 is a call flow diagram for a call handled under the CFO model, where call handling rules provide for user 120 to make a real time selection via a client 150 to forward the call to a telephone number outside PBX 110, according to an embodiment. Initial call flow processing is the same as in the embodiment illustrated by FIG. 10. However, when the proxy 134 determines that the user selected address is an address (e.g., a telephone number) outside of the extensions served by the PBX 110, proxy 134 sends a SIP INVITE message to PBX 110, and not a REFER message, to facilitate the forwarding of the call. PBX 110 then attempts to connect the call to the user selected address using an appropriate signaling method (in this example, using SIP signaling). The result of the connection attempt is provided to proxy 134 and application server 136.

The call flow shown in FIG. 11 corresponds to a PBX 110 that does not allow users to transfer calls to external numbers outside the PBX 110, e.g., for security purposes. Accordingly, the notation "PBX No FWD to outside line" appears on the left-hand side of FIG. 11 If the PBX 110 does not allow users to forward calls, then the Proxy 134 is configured to initiate a new call and maintain the call as if it had originally placed the call to the number selected for forwarding calls.

d. Find Me Follow Me

In general, because PBX 110 is likely unable to forward a call to an address outside the PBX 110, FIG. 7, discussed above, provides a call flow diagram for a call handled under the CFO model as well as the 3PCC model, where call handling rules provide for user 120 to receive real time notification of a call via a client 150, and for a call to be forwarded according to FMFM rules, according to an embodiment.

3. Simultaneous Ring Model a. Call Notification

Figure 12:
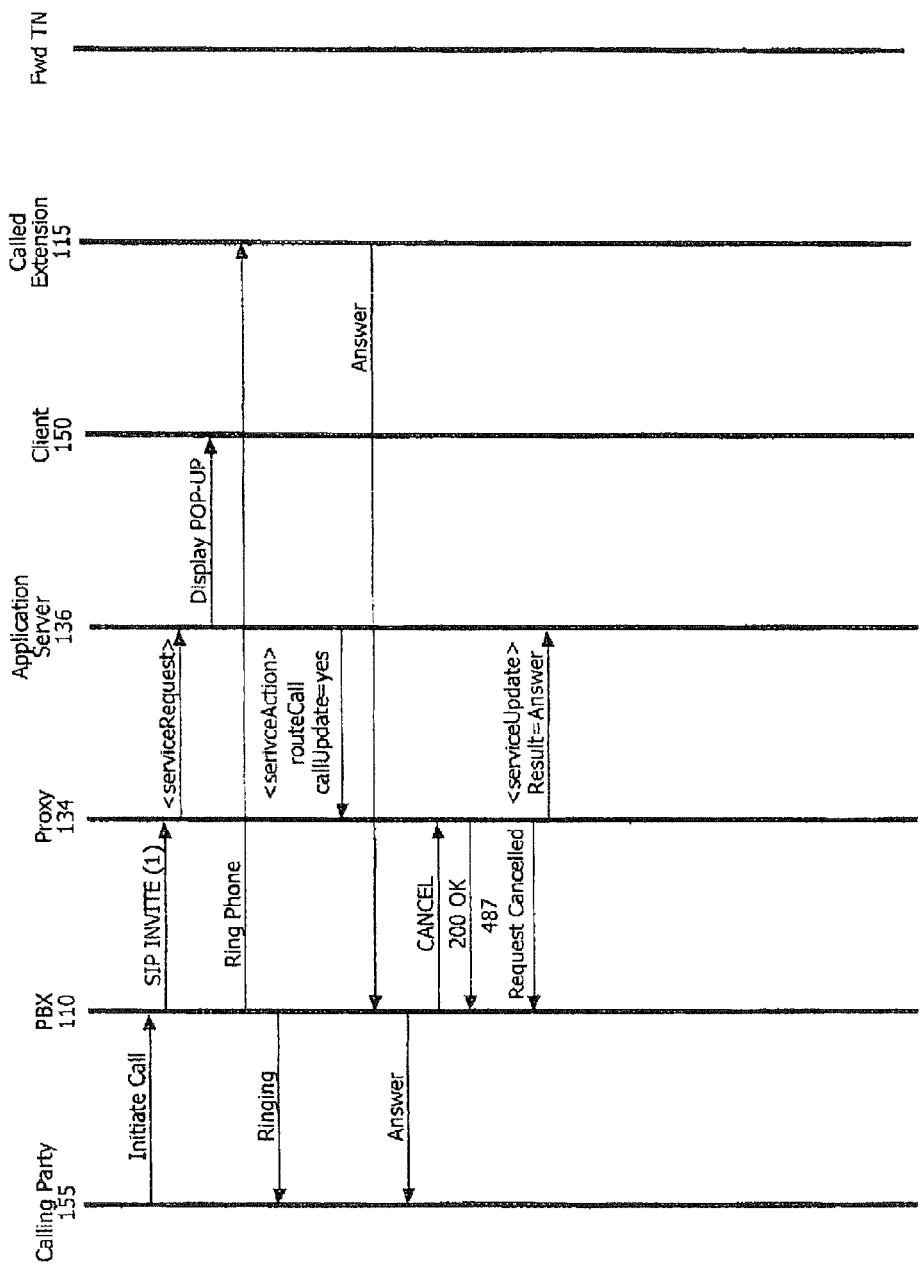
FIG. 12 is a call flow diagram for a call handled under the Simultaneous Ring model, where call handling rules provide for a user to receive notification of a call via a client, according to an embodiment.

FIG. 12 is a call flow diagram for a call handled under the SimRing model, where call handling rules provide for user 120 to receive notification of a call via a client 150, according to an embodiment. FIG. 12 is similar to FIGS. 3 and 8 above, although it can be seen in FIG. 12 that, contemporaneously with PBX 110 sending a SIP INVITE message to proxy 134, PBX 110 also attempts to connect the call to the called extension 115 of the called party. Once the call is answered, PBX 110 sends a message to proxy 134 canceling the INVITE request.

If there is no answer to the call, the PBX 110 applies normal call coverage routing options known to those skilled in the art, e.g., overflow to voicemail or any of the valid PBX 110 processing options for dealing with a no answer scenario. In the case of overflow to voicemail, the PBX 110 will still send a CANCEL message to proxy 134 to terminate the pending INVITE transaction with proxy 134 also sending a "<serviceUpdate> Result=NoAnswer" message.

b. Route to Default Telephone Number

Figure 13:
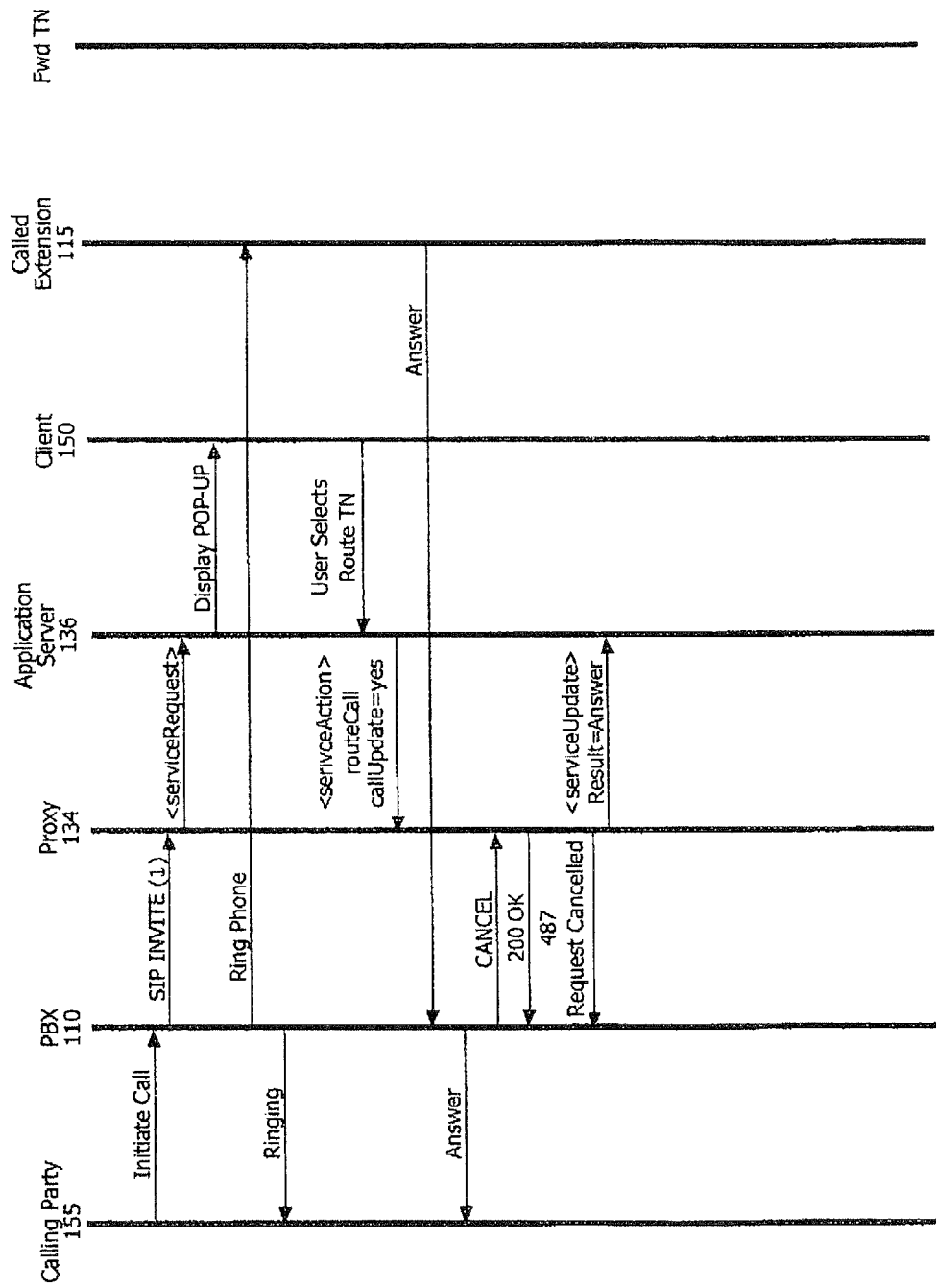
FIG. 13 is a call flow diagram for a call handled under the Simultaneous Ring model, where call handling rules provide for a user to receive real time notification of a call via a client, and to make a real time selection to route the call to a predetermined (i.e., default) telephone number, according to an embodiment.

FIG. 13 is a call flow diagram for a call handled under the SimRing model, where call handling rules provide for user 120 to receive real time notification of a call via a client 150, and to make a real time selection to route the call to a predetermined (i.e., default) telephone number, according to an embodiment. FIG. 13 is similar to FIGS. 4 and 9 above, although it can be seen in FIG. 13 that, contemporaneously with PBX 110 sending a SIP INVITE message to proxy 134, PBX 110 also attempts to connect the call to the called extension 115 of a called party. Once the call is answered, PBX 110 sends a message to proxy 134 canceling the INVITE request.

c. Call Forward

Figure 14:
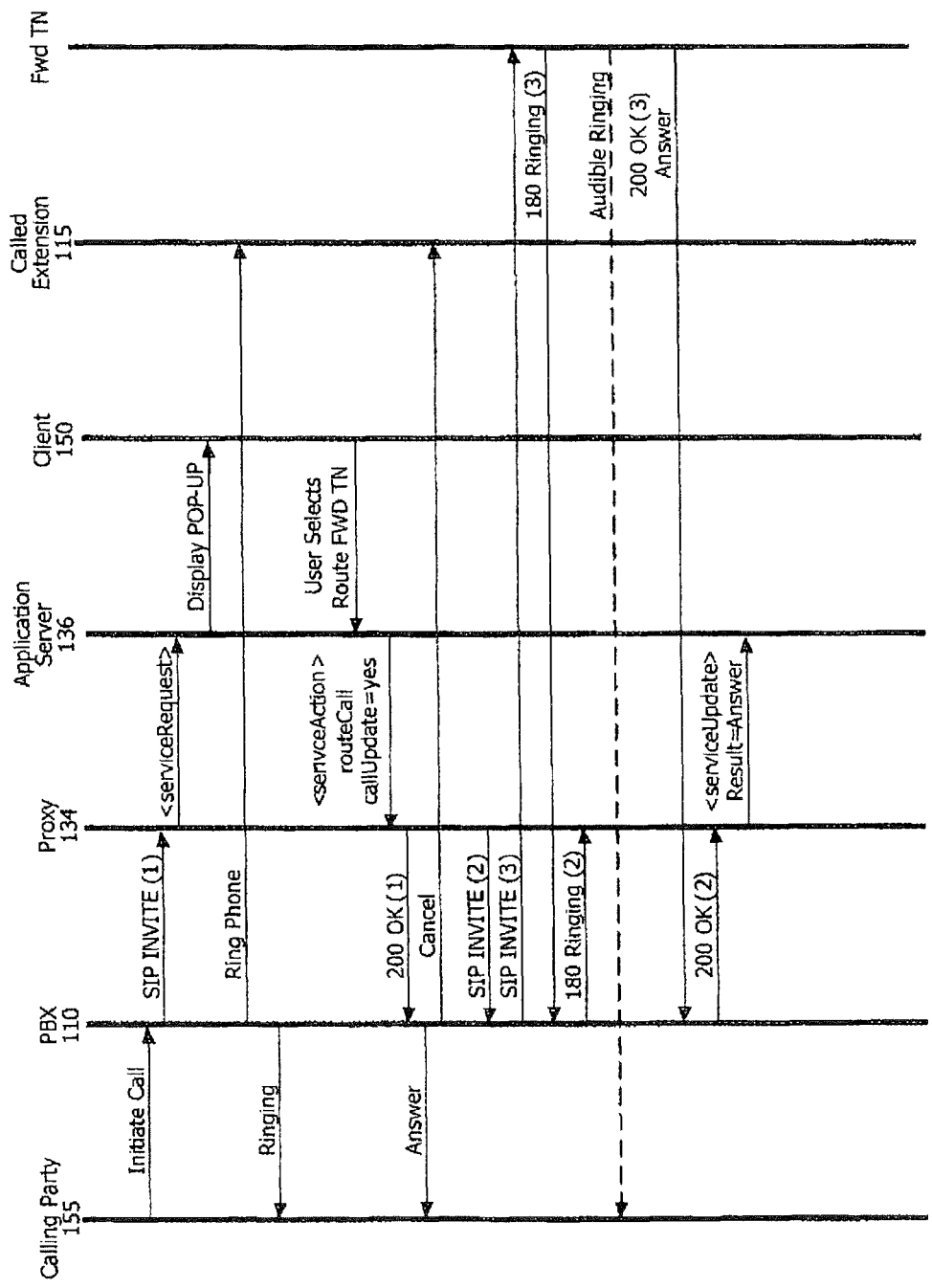
FIG. 14 is a call flow diagram for a call handled under the Simultaneous Ring model, where call handling rules provide for a user to receive real time notification of a call via a client, and to make a real time selection as to a telephone number to which the call should be sent, according to an embodiment.

FIG. 14 is a call flow diagram for a call handled under the SimRing model, where call handling rules provide for user 120 to receive real time notification of a call via a client 150, and to make a real time selection as to n address (e.g., a telephone number) to which the call should be sent, according to an embodiment. FIG. 14 is similar to FIGS. 5 and 10 above, although it can be seen in FIG. 14 that, contemporaneously with PBX 110 sending a SIP INVITE message to proxy 134, PBX 110 also attempts to connect the call to the called extension 115 of a called party. If the call is forwarded per the user 120 input to the display pop-up, PBX 110 cancels the call attempt to the called extension 115 and, in response to a SIP INVITE message from proxy 134, attempts to connect the call to the selected forwarding address (e.g., phone number TN in this example).

d. Forward to Voicemail

Figure 15:
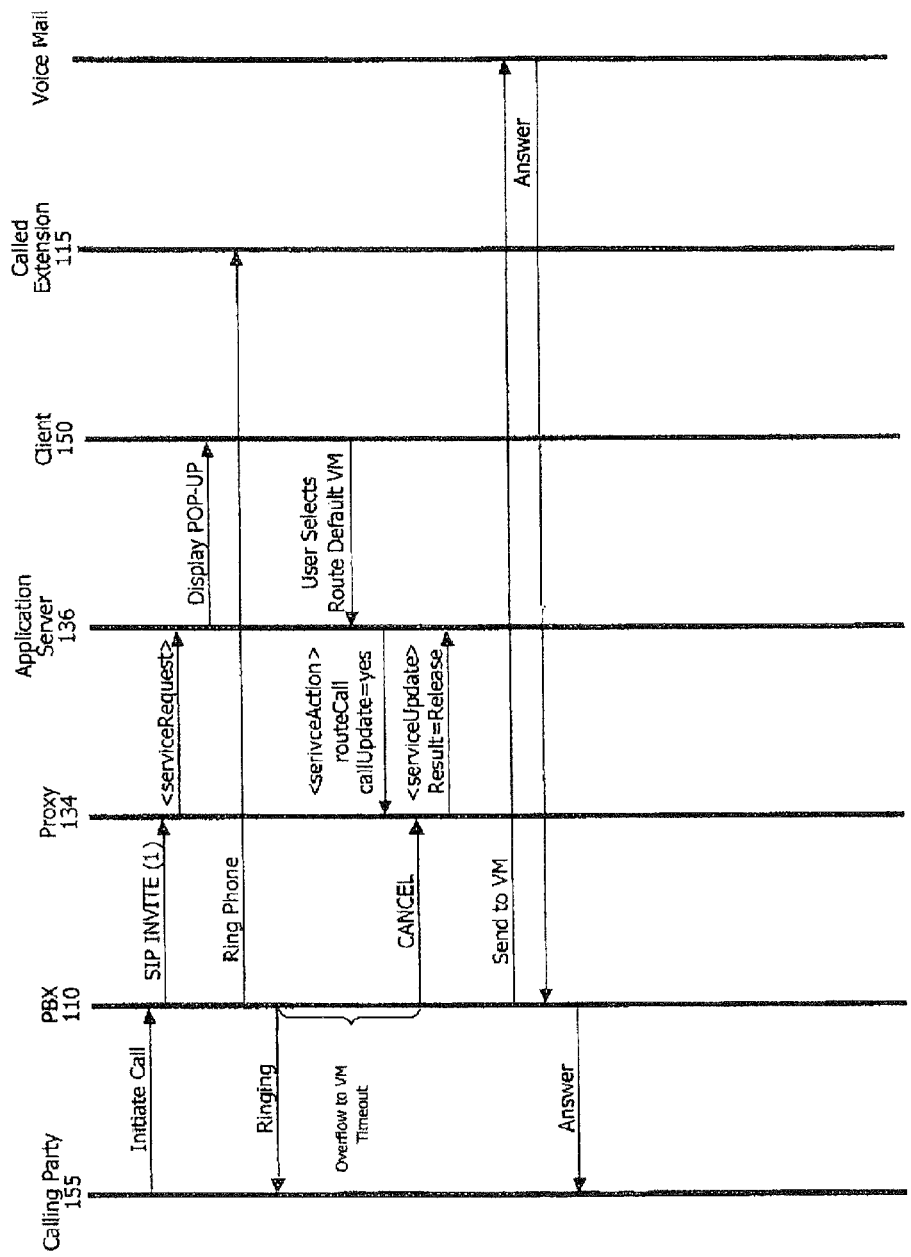
FIG. 15 is a call flow diagram for a call handled under the Simultaneous Ring model, where call handling rules provide for a user to receive real time notification of a call via a client, and to make a real time selection to forward the call to a voice mail account, while simultaneously ringing the extension of an end user, according to an embodiment.

FIG. 15 is a call flow diagram for a call handled under the SimRing model, where call handling rules provide for user 120 to receive real time notification of a call via a client 150, and to make a real time selection to forward the call to a voice mail account, while simultaneously ringing the called extension 115 of a called end user 120, according to an embodiment. In this embodiment, a call may be sent to voice mail either upon the selection of a user 120 via the display pop-up window on a client 150, or by default (e.g., as a result of exceeding a set delay period, indicated as the "overflow" period in FIG. 15). Thus, in this embodiment, even if client 150 is turned off or for some reason is unable to receive messages from application server 136, a call may be sent to voicemail even if a user 120 is unable to answer or otherwise respond to the call.

The initial steps of the embodiment of FIG. 15 are similar to those of previous embodiments: PBX 110 receives a call request from calling party 155 to a called extension 115, PBX 110 sends a SIP INVITE message to proxy 134, proxy 134 sends a service request message to application server 136, and application server 136 causes a pop-up window to be displayed on a client 150 associated with the called party. Contemporaneously with sending the SIP INVITE to proxy 134, PBX 110 attempts to connect the call to called extension 115 using an appropriate connection method. As shown in FIG. 15, a selection is received at application server 136 from client 150 indicating that the call should be sent to voicemail. The application server 136 may then send a message to proxy 134 to route the call to a voice mail associated with the called extension 115 or user 120. Proxy 134 then sends a message to PBX 110 to cancel the call attempt to the called extension 115 and establish a connection with the associated voice mail.

The scenario shown in FIG. 15 results from use of the SIMRING method where the PBX 110 does not support proxy 134 call control, hence the need to use SIMRING. Although the user 120 has indicated the desire to route the call to voice mail, the proxy 134 is unable to take action and simply waits until the PBX 110 times out and routes the call to voice mail itself, sending the corresponding CANCEL message to proxy 134 to terminate the request.

e. Find Me Follow Me

Figure 16:
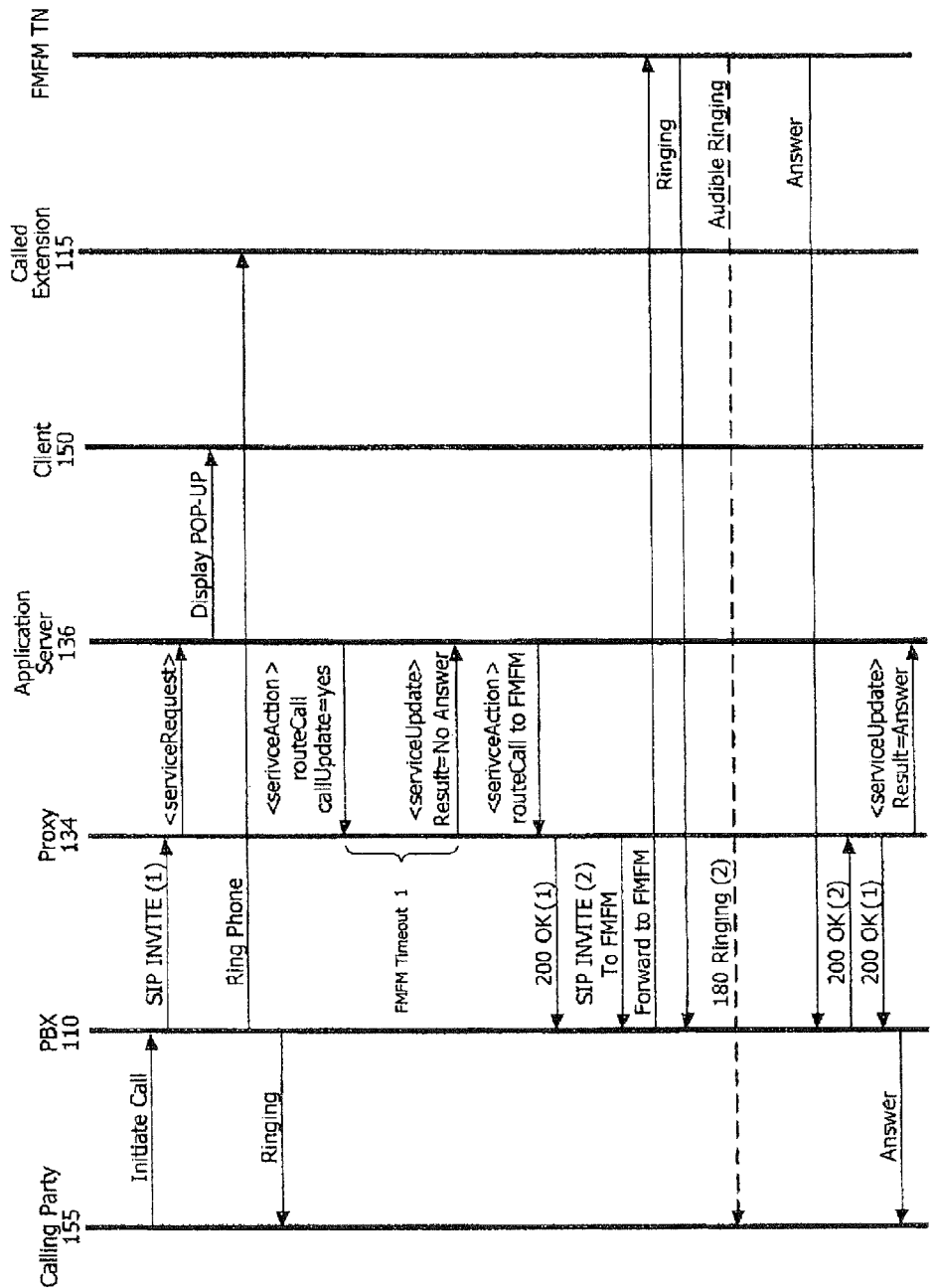
FIG. 16 is a call flow diagram for a call handled under the Simultaneous Ring model, where call handling rules provide for a user to receive real time notification of a call via a client, and for a call to be forwarded according to find me follow me rules, according to an embodiment.

FIG. 16 is a call flow diagram for a call handled under the SimRing model, where call handling rules provide for user 120 to receive real time notification of a call via a client 150, and for a call to be forwarded according to find me follow me (FMFM) rules, according to an embodiment, Unlike other actions taken under the SimRing model, call forwarding according to FMFM does not require call forwarding taking place simultaneous with attempting to connect to a called extension 115. If a user 120 is at or near the called extension 115, ringing other extensions 115 and/or other addresses will not be advantageous Instead, once a timeout period has elapsed, proxy 134 sends an INVITE message to PBX 110, which rings an extension or telephone number from a list of FMFM numbers associated with the user 120 of the extension 115.

The initial steps of the embodiment of FIG. 16 are the same as those for other described embodiments. Furthermore, the steps of the embodiment of FIG. 16 are similar to the embodiment of FIG. 7. In this embodiment, contemporaneously with sending the SIP INVITE message to proxy 134, PBX 110 attempts to connect the call to called extension 115 using an appropriate signaling method. Application server 136 sends a message to proxy 134 indicating that the proxy 134 should perform a find me/follow me operation. Proxy 134 sets a timeout period for the find me/follow me operation. If proxy 134 receives no indication from PBX 110 that the call attempt to called extension 115 has connected before the end of the timeout period, proxy 134 sends a message to application server 136 that no connection has occurred.

In response to the no connection message, application server 136 may then send a message to proxy 134 with find me follow me instructions for the call—for example, the application server 136 may send an address (e.g., a telephone number) for user 120 that is indicated as the first routing option for find me follow me purposes. Proxy 134 then sends a message to PBX 110 to establish a connection with the find me follow me address, and PBX 110 attempts to establish the connection (using an appropriate signaling method) with the find me follow me address. If the call is answered at the find me follow me address, the call is established and connected. Although not shown in FIG. 16, if the call attempt to the find me follow me number does not result in an answer, additional find me follow me attempts may be made using the same steps as indicated above.

III. CONCLUSION

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of call management, and that the disclosed systems and methods will be incorporated into such future embodiments. Accordingly, it should be understood that the invention is capable of modification and variation and is limited only by the following claims

We claim:

1. A system, comprising:
   an application server configured to provide call management services to a plurality of users of a private branch exchange (PBX), the PBX receiving an incoming call request to an extension of at least one of the plurality of users; and
   a protocol proxy in selective communication with the PBX and the application server, the protocol proxy configured to receive the incoming call request forwarded from the PBX and send the incoming call request to the application server, the incoming call request being received according to a protocol for establishing call sessions;
   wherein the application server is further configured to receive the incoming call request from the protocol proxy and send at least one call routing instruction to the protocol proxy in response to receiving the incoming call request, said at least one call routing instruction configured to instruct the PBX with respect to disposition of the incoming call.

2. The system of claim 1, wherein the at least one call routing instruction is based on at least one input from at least one client device.

3. The system of claim 2, the at least one client device including a graphical user interface (GUI) configured to display information concerning the incoming call request.

4. The system of claim 3, wherein the GUI is further configured to present a plurality of options regarding the incoming call request, the plurality of options including at least one of: (i) forward the incoming call request to voice mail; (ii) forward the incoming call request to another extension of the PBX; (iii) forward the incoming call request to another telephone number; and (iv) do not disturb.

5. The system of claim 1, wherein the at least one call routing instruction is based on information retrieved from a database configured to store the at least one call routing instruction associated with at least one of the plurality of users.

6. The system of claim 1, wherein the at least one call routing instruction is an instruction for at least one of forwarding the incoming call request to voicemail and forwarding the incoming call request to a specified telephone number.

7. The system of claim 1, further comprising at least one software program comprising the application server and the protocol proxy.

8. The system of claim 1, further comprising a computing device that comprises the application server and the protocol proxy.

9. The system of claim 1, wherein the protocol includes Session Initiation Protocol (SIP).

10. The system of claim 1, wherein the application server is further configured to receive call information from at least one of a public switched telephone network (PSTN), a cellular phone network, and a Voice over Internet Protocol (VoIP) network.

11. The system of claim 1, wherein the application server is external to the PBX.

12. The system of claim 1, wherein the protocol proxy is configured to manage an incoming call to the at least one user according to a model selected from one of the following:
   (1) a third party call control model, wherein the protocol proxy remains in control of the incoming call for the duration of the call;
   (2) a call forwarding override model, wherein the protocol proxy removes itself from the incoming call once an action has been taken for redirecting the call; and
   (3) a simultaneous ring model, wherein the PBX sends information relating to the incoming call to the protocol proxy and at the same time attempts to connect the incoming call to an extension on the PBX.

13. A method, comprising:
   receiving an incoming call request in a private branch exchange (PBX) and directed to an extension of the PBX;
   sending, from the PBX, to a protocol proxy in selective communication with the PBX and an application server providing call management services to a plurality of users of the PBX, information relating to the incoming call request according to a protocol for establishing call sessions;
   sending the information relating to the incoming call request from the protocol proxy to the application server configured to provide enhanced call management services to users receiving incoming calls; and
   receiving, by the protocol proxy from the application server, at least one call routing instruction in response to receiving the information relating to the incoming call request, the at least one call routing instruction configured to instruct the PBX with respect to disposition of the incoming call.

14. The method of claim 13, wherein the at least one call routing instruction is based on input from at least one client device.

15. The method of claim 14, the at least one client device including a graphical user interface (GUI), and further comprising displaying information concerning the incoming call request in the GUI.

16. The method of claim 15, further comprising presenting a plurality of options regarding the incoming call request in the GUI, the plurality of options including at least one of: (i) forward the incoming call request to voice mail; (ii) forward the incoming call request to another extension of the PBX; (iii) forward the incoming call request to another telephone number; and (iv) do not disturb.

17. The method of claim 13, further comprising retrieving the at least one call routing instruction from a database storing the at least one call routing instruction associated with at least one user.

18. The method of claim 13, wherein the at least one call routing instruction is an instruction for at least one of forwarding the incoming call to voicemail and forwarding the incoming call to a specified telephone number.

19. The method of claim 13, wherein the protocol includes Session Initiation Protocol (SIP).

20. The method of claim 13, further comprising the application server receiving call information from at least one of a public switched telephone network (PSTN), a cellular phone network, and a Voice over Internet Protocol (VoIP) network.

21. The method of claim 13, further comprising managing the incoming call in the protocol proxy according to a model selected from one of the following:
   (1) a third party call control model, wherein the protocol proxy remains in control of the incoming call for the duration of the call;
   (2) a call forwarding override model, wherein the protocol proxy removes itself from the incoming call once an action has been taken for redirecting the call; and
   (3) a simultaneous ring model, wherein the PBX sends information relating to the incoming call to the protocol proxy and at the same time attempts to connect the incoming call to an extension on the PBX.

22. A system, comprising:
- an application server configured to provide call management services to a plurality of users of a private branch exchange (PBX), the PBX receiving an incoming call request to an extension of one of the plurality of users; and
- a protocol proxy in selective communication with the PBX and the application server, the protocol proxy configured to receive a Session Interchange Protocol (SIP) INVITE message from the PBX and send the SIP INVITE message to the application server, the SIP INVITE message being forwarded by the PBX in response to the PBX receiving the incoming call request, the SIP INVITE message providing the application server with at least a substantially real-time notification of the incoming call request;
- wherein the application server is further configured to receive the forwarded SIP INVITE message from the protocol proxy and send at least one call routing instruction to the protocol proxy in response to receiving the SIP INVITE message to provide at least one call management service, the at least one call routing instruction configured to instruct the PBX with respect to disposition of the incoming call.

23. The system of claim 22, wherein the application server is further configured to notify at least one of the one of the plurality of users and a designated surrogate for the one of the plurality of users of the incoming call in response to the forwarded SIP INVITE message.

24. The system of claim 23, wherein the application server is further configured to redirect or forward the incoming call request using at least one of: (i) SIP REDIRECT, REFER, or UPDATE messages; and (ii) SIP INVITE or REPLACE procedures to modify the media flow between call endpoints.

* * * * *